US012684226B2

(12) United States Patent
Li et al.

(10) Patent No.: US 12,684,226 B2
(45) Date of Patent: Jul. 14, 2026

(54) PHOTOGRAPHING DEVICE AND SYSTEM, CARRIER APPARATUS, CONTROL SYSTEM, AND EXPANSION COMPONENT

(71) Applicant: SZ DJI TECHNOLOGY CO., LTD., Shenzhen (CN)

(72) Inventors: Dexi Li, Shenzhen (CN); Shun Ma, Shenzhen (CN); Zeyuan Xuan, Shenzhen (CN); Yifeng Sun, Shenzhen (CN); Zhou Yang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 109 days.

(21) Appl. No.: 18/539,285

(22) Filed: Dec. 14, 2023

(65) Prior Publication Data
US 2024/0114232 A1 Apr. 4, 2024

Related U.S. Application Data

(63) Continuation of application No. PCT/CN2021/108268, filed on Jul. 23, 2021.

(51) Int. Cl.
*H04N 23/62* (2023.01)
*H04N 23/51* (2023.01)
(Continued)

(52) U.S. Cl.
CPC ............. *H04N 23/62* (2023.01); *H04N 23/51* (2023.01); *H04N 23/57* (2023.01); *H04N 23/651* (2023.01)

(58) Field of Classification Search
CPC ........ H04N 23/51; H04N 23/57; H04N 23/62; H04N 23/65; H04N 23/651; H04N 23/66; H04N 23/667
See application file for complete search history.

(56) References Cited

U.S. PATENT DOCUMENTS

| | | | |
|---|---|---|---|
| 8,750,674 B2 * | 6/2014 | Cornell | H04N 23/632 |
| | | | 386/224 |
| 10,356,291 B2 * | 7/2019 | Woodman | H04N 23/50 |

(Continued)

FOREIGN PATENT DOCUMENTS

| | | |
|---|---|---|
| CN | 1567672 A | 1/2005 |
| CN | 103633671 A | 3/2014 |

(Continued)

OTHER PUBLICATIONS

International Search Report and Written Opinion mailed on Apr. 14, 2022, received for PCT Application PCT/CN2021/108268, filed on Jul. 23, 2021, 13 pages including English Translation.

*Primary Examiner* — Amy R Hsu
(74) *Attorney, Agent, or Firm* — ANOVA LAW GROUP, PLLC

(57) ABSTRACT
A photographing device may include an image sensor to capture a first image; a first quick release interface to detachably connect with at least one expansion structure; and a first processor configured to: control the photographing device to perform an operation based on a first instruction input by a user at the photographing device and a second instruction sent by the expansion structure under a condition that the photographing device is connected with the expansion structure. The operation may comprise controlling the image sensor to capture the first image.

17 Claims, 16 Drawing Sheets

<u>100</u>

(51) Int. Cl.
     *H04N 23/57*        (2023.01)
     *H04N 23/65*        (2023.01)

(56) References Cited

U.S. PATENT DOCUMENTS

| | | | | |
|---|---|---|---|---|
| 10,667,105 | B2 * | 5/2020 | Wang | H04W 4/80 |
| 10,944,893 | B1 * | 3/2021 | Daulton | G06F 1/1632 |
| 2012/0268648 | A1 * | 10/2012 | Yang | G02B 7/102 |
| | | | | 348/360 |
| 2017/0339319 | A1 * | 11/2017 | Woodman | H04N 23/51 |
| 2020/0236262 | A1 * | 7/2020 | Moncino | H04N 23/617 |
| 2020/0288055 | A1 * | 9/2020 | Varnum | G03B 17/04 |

FOREIGN PATENT DOCUMENTS

| | | | |
|---|---|---|---|
| CN | 106357981 | A | 1/2017 |
| CN | 206057973 | U | 3/2017 |
| CN | 206212118 | U | 5/2017 |
| CN | 108476281 | A | 8/2018 |
| CN | 108769531 | A | 11/2018 |
| CN | 208112681 | U | 11/2018 |
| CN | 209390165 | U | 9/2019 |
| CN | 209690689 | U | 11/2019 |
| CN | 209823871 | U | 12/2019 |
| CN | 112821515 | A | 5/2021 |
| EP | 1388921 | A2 | 2/2004 |
| WO | 2017/035840 | A1 | 3/2017 |

* cited by examiner

100

10

10

100

10

12

11

60     14 15 502

1011

10

513

523 522 512

11

1111

111

521 511

53     52     51     53     52     51

52     502

10

10

20

<u>20</u>

<u>20</u>

20

100

100

100

10

20a

20b

200

Control system

Carrier Apparatus

70

Photographing device

10

Movable platform

80

70

70

PHOTOGRAPHING DEVICE AND SYSTEM, CARRIER APPARATUS, CONTROL SYSTEM, AND EXPANSION COMPONENT

CROSS-REFERENCE TO RELATED APPLICATION

The present application is a continuation of International Application No. PCT/CN2021/108268, filed Jul. 23, 2021, the entire contents of which being incorporated herein by reference in its entirety.

TECHNICAL FIELD

The present disclosure relates to the field of imaging technology and, in particular, to a photographing device, a photographing system, a carrier apparatus, a control system and an expansion component.

BACKGROUND

At present, in order to meet market demand for photographing during sports, small sport cameras have been introduced on the market. However, the functions of a single camera are limited and the supported usage scenarios are also limited. It cannot meet the usage needs of multiple scenarios, and users also face many inconveniences during use.

SUMMARY

Embodiments of the present disclosure provide a photographing apparatus, a photographing system, a carrier apparatus, a control system, and an expansion component.

Some embodiments of the present disclosure provide a photographing device. The photographing device may include an image sensor to capture a first image; a first quick release interface to detachably connect with at least one expansion structure; and a first processor configured to: control the photographing device to perform an operation based on a first instruction input by a user at the photographing device and a second instruction sent by the expansion structure under a condition that the photographing device is connected with the expansion structure. The operation may comprise controlling the image sensor to capture the first image.

Some Embodiments of the present disclosure provide a photographing system. The photographing system may include a photographing device, the photographing device comprising an image sensor, a first quick release interface and a first processor, the image sensor being capable of acquiring a first image; and an expansion structure, the expansion structure comprising a second quick release interface cooperating with the first quick release interface, and a second processor, the second quick release interface capable of being detachably connected with the first quick release interface; wherein, under a condition that the photographing device is connected with the expansion structure, the first processor is configured to control the photographing device to perform an operation based on a first instruction input by a user on the photographing device and a second instruction, the operation comprising controlling the image sensor to capture the first image; and the second processor is configured to control the expansion structure to send the second instruction to the photographing device.

Some embodiments of the present disclosure provide a photographing device. The photographing device may include a first body; a first quick release interface in the first body to detachably connect with a second quick release interface of an expansion structure; the first quick release interface comprising a first mechanical coupling interface, and the second quick release interface comprising a second mechanical coupling interface; and an image sensor in the first body to capture a first image; wherein at least one of the first mechanical coupling interface or the second mechanical coupling interface comprises a magnetic structure to adsorb the photographing device to the expansion structure.

Some embodiments of the present disclosure provide a photographing system. The photographing system includes a photographing device and an expansion component. The photographing device includes an image sensor, a first quick release interface, a first battery and a first processor. The image sensor is used to acquire a first image, the first battery is used to power the image sensor, and the first processor is electrically connected to the first battery and the image sensor. The expansion component comprises a second quick release interface, a second battery and a second processor mating with the first quick release interface, the second quick release interface being capable of being detachably connected to the first quick release interface. wherein, in the case where the photographing device is connected with the expansion part, the second processor is used to send second power level information of the second battery to the first processor; the first processor is used to control the first battery to charge the second battery according to the acquired first power level information of the first battery and the second power level information, so as to balance the power level of the first battery with the power level of the second battery; or, the second processor for sending the second power information of the second battery to the first processor; the first processor for sending a charging instruction to the expanding member based on the second power information; the second processor further for controlling the second battery to charge the first battery based on the charging instruction to balance the power of the first battery with the power of the second battery's power level.

Some embodiments of the present disclosure provide a photographing system. The photographing system includes a photographing device and an expansion component. The photographing device includes an image sensor, a first quick release interface, a first battery and a first processor. The image sensor is used to acquire a first image, the first battery is used to power the image sensor, and the first processor is electrically connected to the first battery and the image sensor. The expansion part comprises a second quick release interface, a second battery and a second processor cooperating with the first quick release interface, the second quick release interface being capable of being detachably connected to the first quick release interface. In the case where the photographing device is coupled with the expansion component, the second processor is used to send second power level information of the second battery to the first processor; the first processor is used to control the first battery to charge the second battery according to the acquired first power level information of said first battery and the second power level information, so as to balance the power level of the first battery with the power level of the second battery; or the second processor for sending the second power information of the second battery to the first processor; the first processor for sending a charging instruction to the expanding component based on the second power information; the second processor further for controlling the second battery to charge the first battery based on the charging instruction to balance the power level of the first battery with the power level of the second battery.

Some embodiments of the present disclosure provide a carrier apparatus for carrying a photographing device. The carrier apparatus comprises a second quick release interface, at least one attitude sensor, a wireless communication device and a controller. The second quick release interface is for detachably connecting with the photographing device; the at least one attitude sensor is for collecting first attitude information of the carrier apparatus; the wireless communication device is for wirelessly communicating with a removable platform; and the controller is electrically connected to the at least one of the attitude sensors and to the wireless communication device. wherein the photographing device is optionally detachably connected to the carrier apparatus or the movable platform, wherein when the photographing device is detachably connected to the carrier apparatus, the controller controls the photographing device to film; and wherein when the photographing device is detachably connected to the movable platform, the controller remotely controls the movable platform based on the first attitude information via the wireless communication means for the movable platform movement or/and the photographing device photographing.

Some embodiments of the present disclosure provide a control system for a movable platform. The control system comprises a photographing device, a movable platform, and a carrier apparatus. The photographing device is capable of being selectively detachably connected to the movable platform or the carrier apparatus. The carrier apparatus comprises at least one attitude sensor for detecting first attitude information of the carrier apparatus. wherein the carrier apparatus is used to control the photographing device for photographing when the photographing device is detachably connected to the carrier apparatus; and wherein the carrier apparatus is used to remotely and wirelessly control the movement of the movable platform and/or the photographing of the photographing device on the basis of the first attitude information when the photographing device is connected to the movable platform.

Some embodiments of the present disclosure provide an expansion component. The expansion component comprises a second body and a second quick release interface. The second quick release interface is provided in the second body for detachable connection with a photographing device. The photographing device is provided with a first quick release interface, the first quick release interface comprising a first mechanical coupling interface, and the second quick release interface comprising a second mechanical coupling interface. wherein at least one of the first mechanical coupling interface and the second mechanical coupling interface comprises a magnetic member for adsorbing the photographing device with the expansion component.

Some embodiments of the present disclosure provide a photographing system. The photographing system includes a photographing device and an expansion component. The photographing device comprises a first body, an image sensor and a first quick release interface. The image sensor is provided in the first body, and the image sensor is used to capture a first image. The first quick release interface includes a first mechanical coupling interface. The expansion component includes a second body and a second quick release interface that is compatible with the first interface, the second quick release interface being disposed on the second body, the second quick release interface being able to be detachably connected with the first quick release interface, the second quick release interface including a second mechanical coupling interface. At least one of the first mechanical coupling interface and the second mechanical coupling interface comprises a magnetic member or structure to adsorb the photographing device to the expansion component.

The photographing device, the photographing system, the carrier apparatus, the control system, and the expansion component in some embodiments of the present disclosure are able to expand different functions for the photographing device, as well as to be able to be combined into different forms of use to realize the photographing of different scenarios through the removable connection of the photographing device with different expansion components or the carrier apparatus, so that the user does not need to acquire multiple cameras for various application scenarios.

Additional aspects and advantages of embodiments of the present disclosure will be given, in part, in the following description, and in part will become apparent from the following description or be learned through the practice of embodiments of the present disclosure.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

DETAILED DESCRIPTION

The technical solutions in the embodiments of the present disclosure will be described below in conjunction with the accompanying drawings in the embodiments of the present disclosure. Obviously, the described embodiments are only some of the embodiments of the present disclosure, not all of them. Based on the embodiments in this disclosure, all other embodiments obtained by persons of ordinary skill in the art without making creative efforts belong to the scope of protection of this disclosure.

In the present disclosure, unless otherwise expressly provided and limited, the first feature being "above" or "below" the second feature may be a direct contact between the first and second features, or an indirect contact between the first and second features through an intermediate medium. Furthermore, the first feature being "above" or "on" the second feature may be that the first feature is directly above or diagonally above the second feature, or simply that the first feature is horizontally higher than the second feature. The first feature is "below", "under" or "underneath" the second feature may be that the first feature is directly below or diagonally below the second feature, or simply that the first feature is horizontally lower than the second feature.

In the description of the present disclosure, unless stated otherwise, the terms "coupled," and "connected" should be construed broadly. For example, they can be construed as fixedly connected or detachably connected or integrally connected. They can be mechanically connected or electrically connected and can be directly connected or indirectly connected through an intermediate medium. There can also be an internal connection between two elements. A person of ordinary skill in the art would understand the specific meaning of the terms in the disclosure in specific situations.

Figure 1:
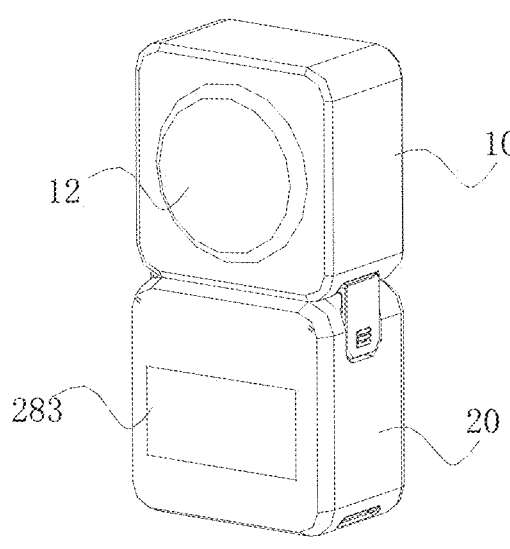
FIG. 1 is a schematic diagram of a structure of a photographing system in some embodiments of the present disclosure.
Figure 2:
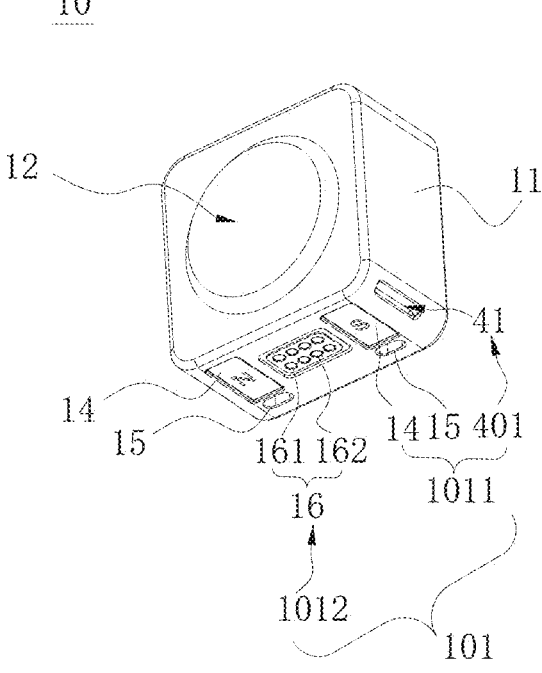
FIGS. 2 to 3 are schematic diagrams of a structure of a photographing device in some embodiments of the present disclosure.
Figure 9:
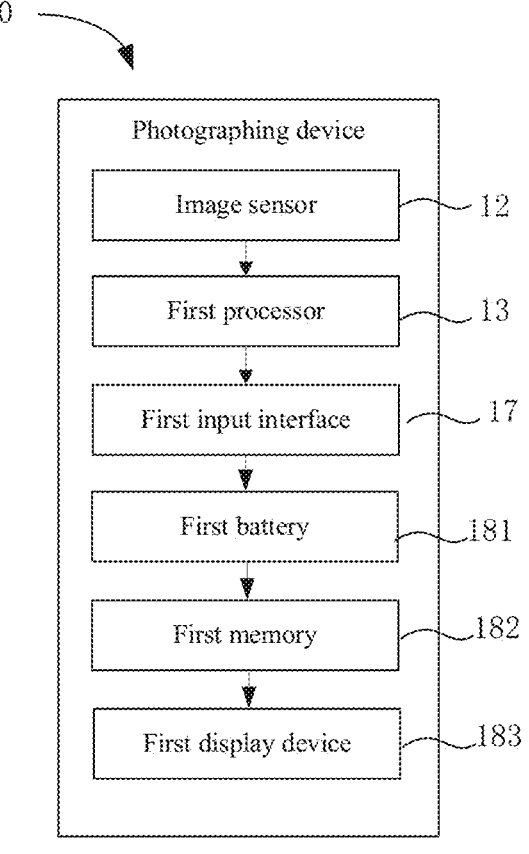
FIG. 9 is a schematic diagram of a structure of a photographing device in some embodiments of the present disclosure.

Referring to FIGS. 1, 2, and 9, an embodiment of the present disclosure provides a photographing device 10. The photographing device 10 includes an image sensor 12, a first quick release interface 101, and a first processor 13. The image sensor 12 is used to acquire a first image, and the first quick release interface 1014 is used to be detachably coupled with at least one expansion component 20. The first processor 13 is used to control the photographing device 10 to perform a corresponding operation in case the photographing device 10 is coupled with the expansion component 20, which may be wired or wireless or a combination of both, based on a detected first instruction inputted by a user at the photographing device 10 and a received second instruction sent by the expansion component 20. The operation may include controlling the image sensor 12 to acquire the first image.

Referring to FIG. 1, FIG. 2, FIG. 9, FIG. 10, and FIG. 15, an embodiment of the present disclosure provides a photographing system 100, the photographing system 100 includes a photographing device 10 and an expansion component or structure 20. The photographing device 10 includes an image sensor 12, a first quick release interface 101, and a first processor 13. The image sensor 12 is used to acquire a first image. The expansion component 20 includes a second quick release interface 201 that is compatible with the first quick release interface 101, and a second processor 23, and the second quick release interface 201 is capable of being detachably connected to the first quick release interface 101. Wherein, in the case where the photographing device 10 is coupled with the expansion component 20, the first processor 13 is used to control the photographing device 10 to perform a corresponding operation according to the first instruction inputted by the user on the photographing device 10 and the second instruction, the operation including controlling the image sensor 12 to acquire the first image; and the second processor 23 is used to control the expansion component 20 to send the second instruction to the photographing device 10.

Referring to FIG. 1, FIG. 2, FIG. 9 and FIG. 15, an embodiment of the present disclosure provides a photographing device 10. The photographing device 10 includes an image sensor 12, a first quick release interface 101, a first battery 181 and a first processor 13. The image sensor 12 is used to acquire a first image, and the first quick release interface 101 is used for detachably connecting to an expansion component 20. The first battery 181 is used to power the image sensor 12, and the expansion component 20 is provided with a second battery 281. The first processor 13 is electrically connected to the first battery 181 and the image sensor 12. Wherein, when the photographing device 10 is coupled with the expansion component 20, the first processor 13 is further used to: control the first battery 181 to charge the second battery 281 to balance the power level of the first battery 181 and the power level of the second battery 281 based on the first power level information of the first battery 181 and the second power level information of the second battery 281 of the expansion component 20 obtained from the expansion component 20; or instruct the expansion component 20 to charge and instruct the second battery 281 to charge the first battery 181 to balance the power level of the first battery 181 of the photographing device 10 and the power level of the second battery 281 of the expansion component 20.

Referring to FIG. 1, FIG. 2, FIG. 9, FIG. 10, and FIG. 15, an embodiment of the present disclosure provides a photographing system 100. The photographing system 100 includes a photographing device 10 and an expansion component 20. The photographing device 10 includes an image sensor 12, a first quick release interface 101, a first battery 181, and a first processor 13. The image sensor 12 is used to acquire a first image, the first battery 181 is used to power the image sensor 12, and the first processor 13 is electrically connected to the first battery 181 and the image sensor 12. The expansion component 20 includes a second quick release interface 201 that are compatible with the first quick release interface 101, a second battery 281, and a second processor 23, and the second quick release interface 201 is capable of being detachably connected to the first quick release interface 101. In the case where the photographing device 10 is coupled with the expansion component 20, the second processor 23 is used to send the second power level information of the second battery 281 to the first processor 13; the first processor 13 is used to control the first battery 181 to charge the second battery 281 in accordance with the obtained first power level information of the first battery 181 and the second power level information, so as to balance the power level of the first battery 181 with the power level of the second battery 281. Alternatively, the second processor 23 is used to send the second power level information of the second battery 281 to the first processor 13; the first processor 13 is used to send a charging instruction to the expansion component 20 in accordance with the second power level information; and the second processor 23 is further used to control, in accordance with the charging instruction, the second battery 281 to charge the first battery 181 so as to balance the power level of the first battery 181 with the power level of the second battery 281.

Figure 23:
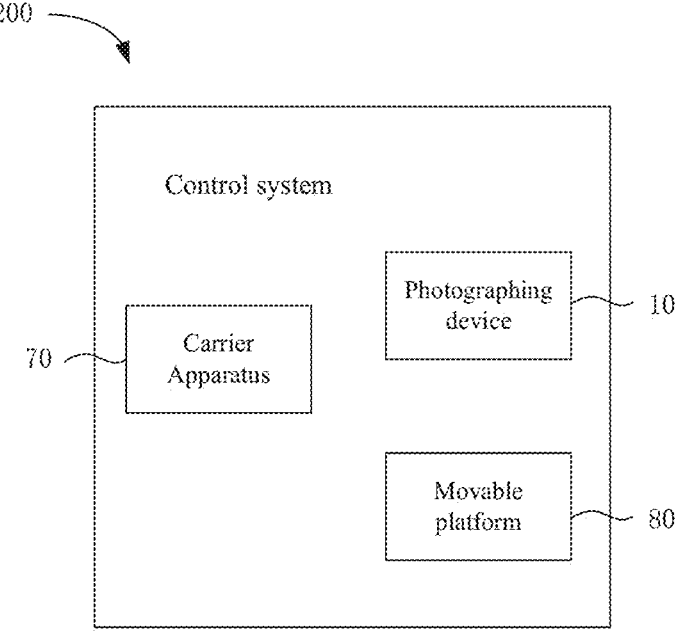
FIG. 23 is a schematic diagram of a structure of a control system in some embodiments of the present disclosure.
Figure 24:
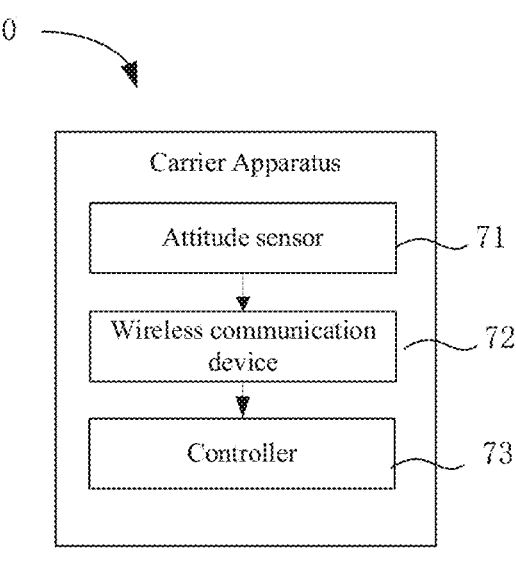
FIG. 24 is a schematic diagram of a structure of a carrier apparatus in some embodiments of the present disclosure.
Figure 25:
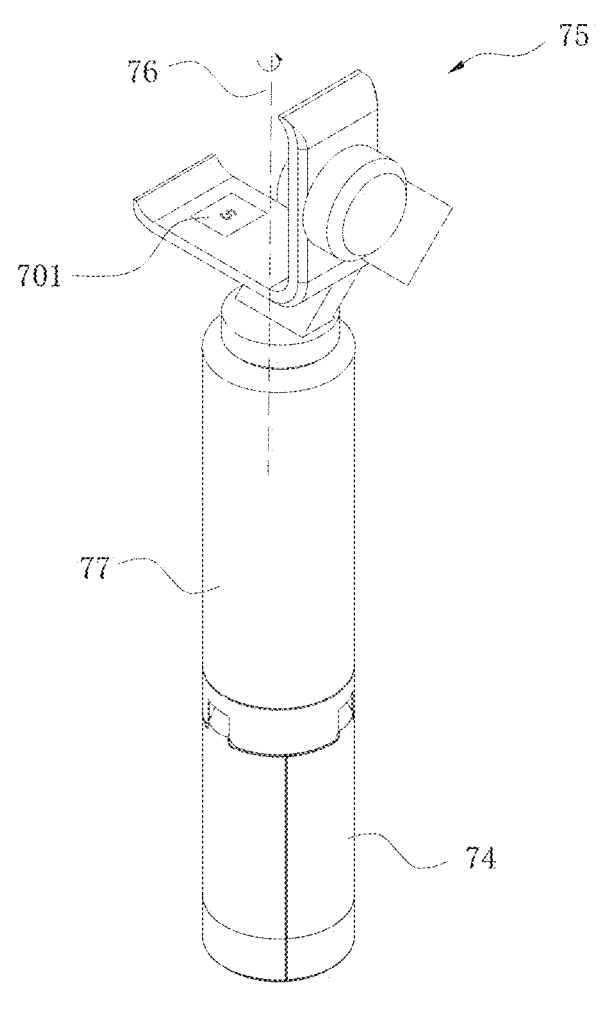
FIG. 25 is a schematic diagram of a structure of a carrier apparatus in some embodiments of the present disclosure.

Referring to FIGS. 23 to 25, an embodiment of the present disclosure provides a carrier apparatus 70 for carrying a photographing device 10, the carrier apparatus 70 comprising a second quick release interface 701, at least one attitude sensor 71, a wireless communication device 72, and a controller 73. The second quick release interface 701 is used for detachably connecting with the photographing device 10; the at least one attitude sensor 71 is used for collecting first attitude information of the carrier apparatus 70; the wireless communication device 72 is used for wirelessly communicating with a movable platform 80; the controller 73 is electrically connected to at least one of the attitude sensor 71 or the wireless communication device 72. The photographing device 10 is selectively detachably connected to the carrier apparatus 70 or the movable platform 80, wherein the controller 73 controls the photographing device 10 to film when the photographing device 10 is detachably connected to the carrier apparatus 70. The controller 73 remotely controls the movement of the movable platform 80 via the wireless communication device 72 based on the first attitude information when the photographing device 10 is detachably connected to the movable platform 80 or/and the photographing device 10 to film.

Referring to FIGS. 23 and 24, an embodiment of the present disclosure provides a control system 200 of a movable platform 80. The control system 200 includes a photographing device 10, a movable platform 80, and a carrier apparatus 70. The photographing device 10 is capable of being selectively detachably coupled with the movable platform 80 or the carrier apparatus 70. The carrier apparatus 70 includes at least one attitude sensor 71 for detecting first attitude information of the carrier apparatus 70. Among other things, when the photographing device 10 is detachably connected with the carrier apparatus 70, the carrier apparatus 70 is used to control the photographing device 10 to film; and when the photographing device 10 is connected with the movable platform 80, the carrier apparatus 70 is used to remotely and wirelessly control the movement of the movable platform 80 and/or photographing of the photographing device 10 based on the first attitude information.

Figure 10:
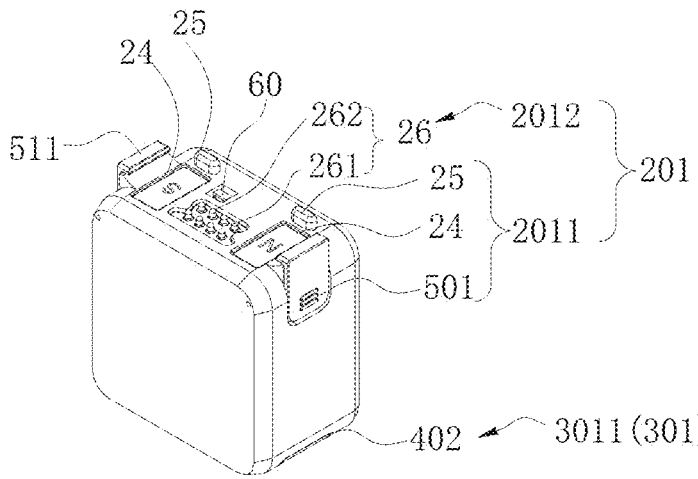
FIG. 10 is a schematic structural diagram of an expansion component in some embodiments of the present disclosure.

Referring to FIGS. 1, 2, and 10, an embodiment of the present disclosure provides a photographing device 10. The photographing device 10 comprises a first body 11, a first quick release interface 101, an image sensor 12, and a first processor 13. The first quick release interface 101 is disposed in the first body 11 for detachably connecting with a second quick release interface 201 of the expansion component 20. The first quick release interface 101 includes a first mechanical coupling interface 1011, and the second quick release interface 201 includes a second mechanical coupling interface 2011. The image sensor 12 is disposed in the first body 11, and the image sensor 12 is used to capture a first image. Wherein at least one of the first mechanical coupling interface 1011 or the second mechanical coupling interface 2011 comprises a magnetic member to adsorb the photographing device 10 to the expansion component 20.

Referring to FIGS. 1, 2, and 10, an embodiment of the present disclosure provides an expansion component 20, which includes a second body 21 and a second quick release interface 201, which is provided in the second body 21, and the second quick release interface 201 is used for detachably connecting with the photographing device 10. The photographing device 10 is provided with a first quick release interface 101, the first quick release interface 101 comprising a first mechanical coupling interface 1011, and the second quick release interface 201 comprising a second mechanical coupling interface 2011. At least one of the first mechanical coupling interface 1011 or the second mechanical coupling interface 2011 comprises a magnetic member to enable the photographing device 10 to be adsorbed with the expansion component 20.

Referring to FIGS. 1, 2 and 10, an embodiment of the present disclosure provides a photographing system 100, the photographing system 100 comprising a photographing device 10 and an expansion component 20. The photographing device 10 comprises a first body 11, a first quick release interface 101, an image sensor 12, and a first processor 13. The image sensor 12 is disposed in the first body 11, and the image sensor 12 is used to capture a first image. The first quick release interface 101 is disposed in the first body 11, and the first quick release interface 101 includes a first mechanical coupling interface 1011. The expansion component 20 includes a second body 21 and a second quick release interface 201 that is compatible with the first quick release interface 101. The second quick release interface 201 is disposed in the second body 21, and the second quick release interface 201 is capable of being detachably connected to the first quick release interface 101, and the second quick release interface 201 includes a second mechanical coupling interface 2011. At least one of the first mechanical coupling interface 1011 or the second mechanical coupling interface 2011 includes a magnetic member to adsorb the photographing device 10 to the expansion component 20.

The photographing device 10, the photographing system 100, the carrier apparatus 70, the control system 200, and the expansion component 20 according to some embodiments of the present disclosure, through which the photographing device 10 is detachably connected to the different expansion components 20 or the carrier apparatus 70, can expand different functions for the photographing device 10, as well as can be combined to form different forms of disclosures to realize the photographing of different scenarios, so that the user does not need to purchase a variety of cameras for various disclosure scenarios.

This is further described below in conjunction with the accompanying drawings.

Referring to FIG. 1, the photographing system 100 comprises a photographing device 10 and at least one expansion component 20, the photographing device 10 is used to capture a first image, and the photographing device 10 is capable of being detachably connected to the at least one expansion component 20. In the case where the photographing device 10 is connected to the expansion component 20, the expansion component 20 is capable of expanding functionality for the photographing device 10; and/or expanding disclosure scenarios for use of the photographing device 10.

Referring to FIG. 2, in some embodiments, the photographing device 10 includes a first body 11, an image sensor 12, and a first quick release interface 101. The image sensor 12 is disposed on the first body 11, and the image sensor 12 is used to capture a first image. The first quick release interface 101 is provided on the first body 11, and the first quick release interface 101 is used to detachably connect with the second quick release interface 201 of the expansion component 20 to realize the detachable connection between the first body 11 and the expansion component 20. Since the first body 11 and the expansion component 20 are detachably connected, the user is free to select different expansion component 20 to be connected to the photographing device 10 according to the current disclosure scenario, in order to expand the functions and/or disclosure scenarios of the photographing device 10. It is to be noted that the number of expansion components 20 simultaneously connected to the first body 11 may be one, two, three, four or even more, and is not limited herein.

In some embodiments, the first quick release interface 101 comprises a first mechanical coupling interface 1011, the first mechanical coupling interface 1011 being used to cooperate with a second mechanical coupling interface 2011 of the second quick release interface 201 in the expansion component 20 to realize mechanical coupling of the photographing device 10 and the expansion component 20, i.e., to realize mechanical connection of the photographing device 10 and the expansion component 20. It is to be noted that the first mechanical coupling interface 1011 may include at least one of: a magnetic member, a ferrous member, a card hook, a card slot, a positioning post, and a positioning slot.

Figure 3:
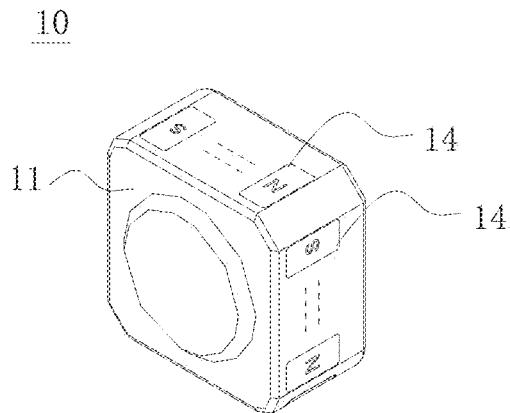
Figure 4:
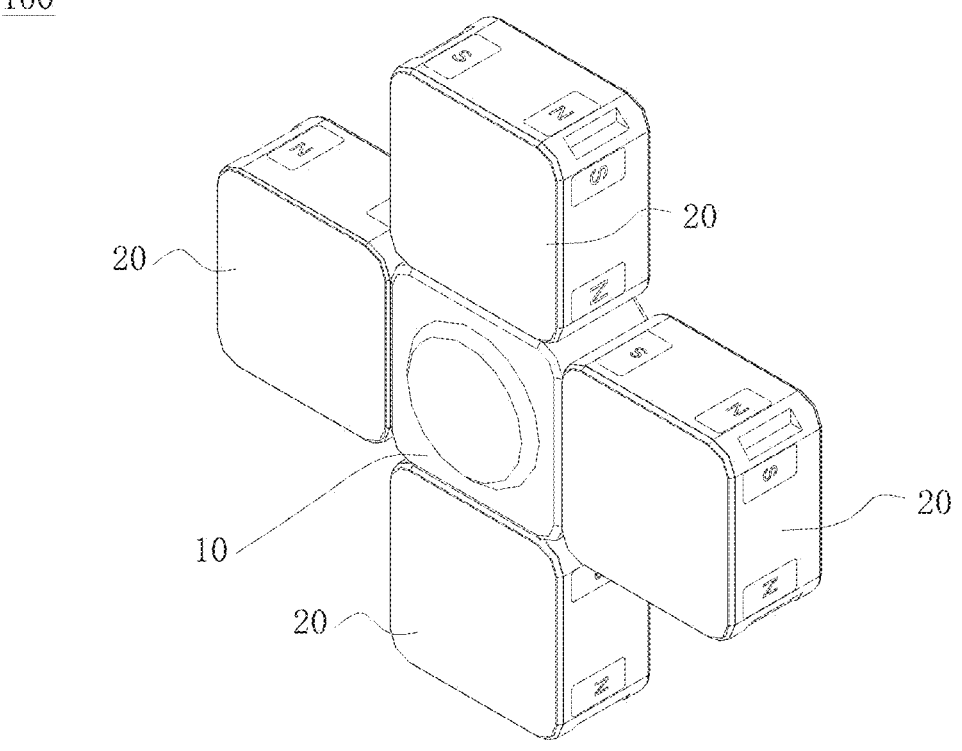
FIG. 4 is a schematic diagram of a structure of a photographing system in some embodiments of the present disclosure.

In some embodiments, the photographing device 10 is magnetically coupled to the expansion component 20. Specifically, referring to FIG. 2, in some embodiments, at least one of the first mechanical coupling interface 1011 or the second mechanical coupling interface 2011 includes a magnetic member to adsorb the photographing device 10 to the expansion component 20. More specifically, please refer to FIG. 2 and FIG. 10 in conjunction with FIG. 2, the first mechanical coupling interface 1011 comprises a first magnetic member 14 disposed on at least one side of the first body 11, while the second mechanical coupling interface 2011 comprises a second magnetic member 24 disposed on the expansion component 20, and the first magnetic member 14 is capable of magnetically connecting with the second magnetic member 24 to realize the magnetic connection between the photographing device 10 and the expansion component 20. It should be noted that in one example, as shown in FIG. 2, the first body 11 may be provided with the first magnetic member 14 on only one side, so that only one side of the photographing device 10 is capable of being magnetically coupled to the expansion component 20; in another example, as shown in FIG. 3, the first body 11 is provided with the first magnetic member 14 on all four sides of the first body 11 that are connected in sequence, so that multiple sides of the photographing device 10 are capable of being magnetically coupled to the expansion component 20 (as shown in FIG. 4). Of course, in some embodiments, it is also possible that the first mechanical coupling interface 1011 includes a first magnetic member 14, and the second mechanical coupling interface 2011 includes a ferrous member, so that the first magnetic member 14 of the first mechanical coupling interface 1011 can also be magnetically connected with the ferrous member of the second mechanical coupling interface 2011, so as to adsorb the photographing device 10 and the expansion component 20 together, which will not be described herein.

Referring to FIG. 2, in some embodiments, there are two first magnetic members 14 on at least one side of the first body 11, wherein the two first magnetic members 14 have opposite magnetic poles. For example, as shown in FIG. 2, the first body 11 is provided with two first magnetic members 14 on one side, wherein the magnetic pole of the first magnetic member 14 on the left side is N-pole, and the magnetic pole of the first magnetic member 14 on the right side is S-pole. It can be understood that since magnetic members have the characteristics of "like-poles repels and opposite-poles attracts" (that is, N pole and N pole repel each other, S pole and S pole repel each other, N pole and S pole attract each other), and the first magnetic pole of the magnetic member 14 on the left is N pole, and the first magnetic pole of the magnetic member 14 on the right is S pole. At this time, when the expansion component 20 is magnetically connected to this side of the first body 11 (the side provided with the first magnetic members 14 with two opposite magnetic poles), the second magnetic member 24 of the S pole on the expansion component 20 can only be magnetically connected with the first magnetic member 14 on the left, and the second magnetic member 24 of the N pole on the expansion component 20 can only be magnetically connected with the first magnetic component 14 on the right. However, if the first magnetic members 14 provided on the same side of the first body 11 all have the same magnetic poles, then the expansion component 20 will be connected to that side of the first body 11 (the side where all the first magnetic components 14 have the same magnetic poles). When magnetically connected, the expansion component 20 can be magnetically connected to the first body 11 in a first posture, and the expansion component 20 can also be magnetically connected to the first body 11 in a second posture. When the expansion component 20 is in the first posture, it rotates 180° along a straight line passing through the plane where the second magnetic member 23 is located, so that the expansion component 20 is in the second posture. In this way, two first magnetic members 14 with opposite magnetic poles are provided on the same side of the first body 11 may define the posture when the expansion component 20 is connected to the photographing device 10, so as to avoid incorrect connection of the expansion component 20 from affecting the user's normal use of the photographing system 100. It should be noted that multiple first magnetic members 14 can also be provided on the same side of the first body 11. Only two of the first magnetic members 14 need to have opposite magnetic poles to limit the connection posture between the expansion component 20 and the photographing device 10. In addition, when the first magnetic member 14 is provided on multiple sides of the first body 11, that is, when multiple sides of the first body 11 can be magnetically connected to the expansion components 20, in one example, the first body 11 can have only one side, wherein two first magnetic members 14 with opposite magnetic poles are provided, and the first magnetic members 14 provided on other sides have the same magnetic poles; in another example, the first body 11 can also be provided with two first magnetic members with opposite magnetic poles on multiple sides, which is not limited here.

Referring to FIGS. 2 and 10, in some embodiments, the first mechanical coupling interface 1011 comprises a first positioning member 15 disposed on the first body 11, while the second mechanical coupling interface 2011 comprises a second positioning member 25 disposed on the expansion component 20. The first positioning member 15 is used to combine with the second positioning member 25. The combination of the first positioning member 15 and the second positioning member 25 can provide a positioning function when the expansion component 20 is connected to the first body 11, which is favorable to the connection of the two. It is noted that in some embodiments, one of the first positioning member 15 or the second positioning member 25 comprises a positioning post and the other comprises a positioning hole, and the positioning post is at least partially housed in the positioning hole when the photographing device 10 is connected to the expansion component 20. For example, in one example, the first positioning member 15 includes a positioning post and the second positioning member 25 includes a positioning hole, and the positioning post of the first positioning member 15 is at least partially housed in the positioning hole of the second positioning member 25 when the photographing device 10 is coupled with the expansion member 20. Again, in another example, the first positioning member 15 includes a positioning hole, the second positioning member 25 includes a positioning post, and the positioning post of the second positioning member 25 is at least partially housed within the positioning hole of the first positioning member 25 when the photographing device 10 is connected to the expansion member 20. In addition, the number of first positioning members 15 provided on the first body 11 may be one or more, and is not limited herein.

Referring to FIGS. 2 and 10, in some embodiments, the first mechanical coupling interface 1011 may also include a first coupling member 401 disposed on the first body 11, while the second mechanical coupling interface 2011 includes a second coupling member 501 disposed on the expansion component 20. The first coupling member 401 is used to combine with the second coupling member 501 of the expansion component 20 to lock the photographing device 10 and the expansion component 20. This prevents the expansion component 20 from falling off from the photographing device 10 when the user is using the photographing system 100, thereby increasing stability of the connection between the expansion component 20 and the photographing device 10.

In some embodiments, the first coupling member 401 is provided with a groove 41 such that when the first coupling member 401 is combined with the second coupling member 501 of the expansion component 20, a snap hook 511 of the second coupling member 501 is at least partially housed within the groove 41 of the first coupling member 401.

Referring to FIGS. 5 to 8 and FIG. 14, in some embodiments, the first mechanical coupling interface 1011 may further comprise a third coupling member 502 disposed on the first body 11, while the second mechanical coupling interface 2011 comprises a fourth coupling member 402 disposed on the expansion component 20. The third coupling member 502 is used to combine with the fourth coupling member 402 of the expansion component 20 for locking the photographing device 10 to the expansion component 20. This prevents the expansion component 20 from falling off from the photographing device 10 when the user is using the photographing system 100, thereby increasing the stability of the connection between the expansion component 20 and the photographing device 10.

In some embodiments, the third coupling member 502 includes a snap fastener 51, a connecting rod 53, and an elastic member 52, and the snap hook 511 is able to be at least partially housed in the groove 41 of the fourth coupling member 402 when the third coupling member 502 is combined with the fourth coupling member 402. More specifically, the snap hook 511 is provided on a side of the snap fastener away from the first body 11. A mounting groove 111 is provided on a side wall of the first body 11 setting the third coupling member 502, and a first mounting member 1111 is provided in the mounting groove 111. The snap fastener 51 is also provided with a mounting hole 512 and a third mounting member 513, and the mounting hole 512 is nearer to the snap hook 511 as compared to the third mounting member 513. The elastic member 52 includes a sleeve portion 521, a first connection portion 522, and a second connection portion 523. The connecting rod 53 passes through the mounting holes 512 of the sleeve portion 521 and the snap hook 51 and is housed in the mounting groove 111 of the side wall of the first body 11. The first connection portion 522 of the elastic member 52 is coupled with the first mounting member 1111 of the first body 11 so that the first connection portion 522 is connected to the first body 11. The second connecting portion 523 of the elastic member 52 is combined with the third mounting member 513 of the snap fastener 51 to connect the second connection portion 523 to the snap fastener 51. In this way the snap fastener 51 is movably provided on the first body 11 and the snap fastener 51 is able to move relative to the first body 11 under external force. Exemplarily, when the snap fastener 51 is subjected to a force, the elastic member 52 undergoes an elastic deformation so that the snap hook 511 is moved away from the first body 11, and the side of the snap fastener 51 that is away from the snap hook 511 is closer to the first body 11; and when the force exerted on the snap fastener 51 disappears, the elastic restoring force of the elastic member 52 moves the snap hook 511 close to the first body 11, and the side of the snap fastener 51 that is away from the snap hook 511 is away from the first body 11.

It is to be noted that the first body 11 may be provided with only the first coupling member 401, or only the third coupling member 502, and of course the first body 11 may be provided with both the first coupling member 401 and the third coupling member 502. In addition, the number of the first coupling member 401 and the third coupling member 502 may be one, two, three, four, or even more, and none of them will be limited herein.

Referring to FIG. 2, in some embodiments, the first quick-release interface 101 also includes a first electrically coupled interface 1012, and when the second quick release interface 201 of the expansion component 20 also includes a second electrical coupling interface 2012 (as shown in FIG. 10). When the first mechanical coupling interface 1011 is coupled with the second mechanical coupling interface 2011 of the expansion component 20, the first electrical coupling interface 1012 can be couple with the second electrical coupling interface 2012 of the expansion component 20 to realize an electrical connection and/or a communication connection between the photographing device 10 and the expansion component 20. It is noted that the first electrical coupling interface 1012 includes at least one of: a contact, a male plug, or a female plug.

In some embodiments, referring to FIG. 2, the first electrical coupling interface 1012 comprises a first connector 16, the first connector 16 being located on the side of the photographing device 10, i.e., the first connector 16 is provided on the side of the first body 11, so that the first connector 16 is able to be communicatively coupled with the expansion component 20 when the photographing device 10 is coupled with the expansion component 20. Specifically, in some embodiments, the first connector 16 comprises a first contact 161, and when the photographing device 10 is connected with the expansion component 20, the first contact 161 cooperates with the expansion component 20 to realize a communication connection between the photographing device 10 and the expansion component 20.

Referring to FIG. 9, in some embodiments, the photographing device 10 further comprises a first battery 181, the first battery 181 being capable of powering the photographing device 10 so that the photographing device 10 works properly. In particular, in some embodiments, the first connector 16 further comprises a second contact 162, wherein the second contact 162 is able to cooperate with the expansion component 20 when the photographing device 10 is connected with the expansion component 20, in order to enable the first battery 181 to power the expansion component 20 through the second contact 162.

In some embodiments, the photographing device 10 may also be communicatively connected to the expansion component 20 via a wireless connection. Exemplarily, the photographing device 10 also includes a wireless communication module, and when the photographing device 10 is connected to the expansion component 20, the photographing device 10 is wirelessly connected to the expansion component 20 via the wireless communication module to realize the communication connection between the two. It is noted that in some embodiments, the first battery 181 is also capable of supplying power to the expansion component 20 through the wireless connection, i.e., realizing the wireless charging function of the photographing device 10 for the expansion component 20. In addition, in one example, the photographing device 10 and the expansion component 20 may be both mechanically connected and wirelessly connected to realize the communication connection between the two; of course, in another example, the photographing device 10 and the expansion component 20 may not be mechanically connected but only wirelessly connected, without limitation herein.

Referring to FIG. 9, in some embodiments, the photographing device 10 may further comprise a first input interface 17, i.e., the first body 11 is also provided with a first input interface 17. the first input interface 17 is used to generate a first instruction in response to a first input of the photographing device 10 by a user. It is noted that the first input interface 17 includes, but is not limited to, at least one of the following: a button, a wheel, a joystick, a microphone, or a touch device. The first input of the photographing device 10 by the user includes, but is not limited to, at least one of the following: a touch input, a press input, a swipe input, a double-tap input, a voice input, or a box-select input. The first input interface 17 and the user's first input to the photographing device 10 referred to below are also explained as such and will not be repeated.

Referring to FIG. 9, in some embodiments, the photographing device 10 may further include a first memory 182, the first memory 182 for storing the first image captured by the image sensor 12. In some embodiments, the photographing device 10 may also include a first display device 183, the first display device 183 for displaying the first image, and/or displaying a GUI interface of the photographing device 10. Exemplarily, in one example, the first display device 183 is provided with the image sensor 12 on opposite sides of the first body 11. Since the photographing device 10 includes the first display device 183 capable of displaying the first image and/or the GUI interface of the photographing device 10, it is beneficial for a user using the photographing device 10, thereby enhancing the user's experience of using the photographing device 10.

Referring to FIG. 10, in some embodiments, the expansion component 20 includes a second body 21 and a second quick release interface 201. The second quick release interface 201 is provided on the second body 21, and the second quick release interface 201 is used to be detachably coupled with the first quick release interface 101 of the photographing device 10 (as shown in FIG. 2). The second quick release interface 201 cooperates with the first quick release interface 101 of the photographing device 10 to realize that the second body 21 can be detachably connected with the first body 11 of the photographing device 10.

In some embodiments, the second quick release interface 201 comprises a second mechanical coupling interface 2011, and the second mechanical coupling interface 2011 is used to cooperate with the first mechanical coupling interface 1011 of the first quick release interface 101 in the photographing device 10 to realize the mechanical coupling between the photographing device 10 and the expansion component 20, i.e., to realize the mechanical connection between the photographing device 10 and the expansion component 20. It is to be noted that the second mechanical coupling interface 2011 may also include at least one of: a magnetic member, a ferrous member, a snap hook, a slot, a positioning post and a positioning slot.

Referring to FIG. 10, in some embodiments, the photographing device 10 is magnetically coupled to the expansion component 20. Specifically, in some embodiments, at least one of the first mechanical coupling interface 1011 and the second mechanical coupling interface 2011 includes a magnetic member to adsorb the photographing device 10 to the expansion component 20. More specifically, please refer to FIG. 10, the second mechanical coupling interface 2011 includes a second magnetic member 24 disposed on at least one side of the second body 21, while the first mechanical coupling interface 1011 includes a first magnetic member 14 disposed on the photographing device 10, and the second magnetic member 24 is capable of being magnetically coupled with the first magnetic member 14 to realize the magnetic connection between the photographing device 10 and the expansion component 20. It should be noted that in one example, the second body 21 may be provided with the second magnetic member 24 on only one side; in another example, the second body 21 is provided with the second magnetic member 24 on multiple sides, at which time the user may select any side provided with the second magnetic member 24 to be magnetically connected to the photographing device 10. For example, the second magnetic member 24 is provided on both the adjacent first side and the second side of the second body 21, and the user may select the first side of the second body 21 to be magnetically connected to the photographing device 10 or the second side of the second body 21 to be magnetically connected to the photographing device 10 according to the demand. Of course, when the second magnetic member 24 is provided on multiple sides of the second body 21, the same expansion component 20 may also be magnetically connected to multiple photographing devices 10, i.e., the same second body 21 may also be magnetically connected to multiple first bodies 11. For example, the photographing system 100 comprises two photographing devices 100, the second body 21 is provided with the second magnetic member 24 on adjacent first and second sides, the first side of the second body 21 is magnetically connected to one of the photographing devices 10, and the second side of the second body 21 is magnetically connected to the other photographing device 10. In addition, in some embodiments, it is also possible that the second mechanical coupling interface 2011 comprises the second magnetic member 24 and the first mechanical coupling interface 1011 comprises a ferrous component, so that the second magnetic member 24 of the second mechanical coupling interface 2011 is also capable of being magnetically coupled with the ferrous component of the first mechanical coupling interface 1011, thereby adsorbing the photographing device 10 with the expansion component 20, which is not described herein.

Similarly, referring to FIG. 10, in some embodiments, when the first body 11 of the photographing device 10 is provided with two first magnetic members 14 with opposite magnetic poles on at least one side, the second body 21 is provided with two second magnetic members 24 on at least one side, wherein the two second magnetic members 24 are provided with opposite magnetic poles, and wherein the magnetic pole of each of the second magnetic members 24 is provided with opposite magnetic poles to the magnetic poles of its corresponding first magnetic members 14. For example, as shown in FIGS. 2 and 10, the first body 11 is provided with two first magnetic members 14 on the side magnetically connected to the expansion component 20, wherein the magnetic pole of the first magnetic member 14 on the left is an N-pole, and the magnetic pole of the first magnetic pole member 14 on the right is the S-pole; and the second body 21 is provided with two second magnetic members 24 on the side magnetically connected to the photographing device 10, wherein the magnetic pole of the second magnetic member 24 on the left is the S-pole and the magnetic pole of the second magnetic member 24 on the right is of the N-pole. According to the characteristic of "repulsion of the same poles and attraction of the opposite poles" (i.e., N pole and N pole repel each other, S pole and S pole repel each other, and N pole and S pole attract each other) of the magnetic members, the second magnetic member 24 with the magnetic pole of the left side of the second body 21 of which the magnetic pole of the second magnetic member 24 is S can only be magnetically coupled with the first magnetic member 14 with the magnetic pole of the left side of the first body 11 of which the magnetic pole of the first magnetic member 14 is N. The second magnetic member 24 with the magnetic pole of the right side of the second body 21 being the N pole can only be magnetically connected to the first magnetic member 14 with the magnetic pole of the right side of the first body 11 being the S pole. In this way, it is possible to limit the attitude of the expansion component 20 when it is connected to the photographing device 10, so as to avoid that the expansion component 20 is connected incorrectly and affects the user's normal use of the photographing system 100. It is to be noted that a plurality of second magnetic members 24 can be provided on the same side of the second body 21, and it is necessary that only two of the second magnetic members 24 have opposite poles, so as to limit the attitude of the expansion component 20 when it is connected to the photographing device 10. Furthermore, when the second magnetic members 24 are provided on multiple sides of the second body 21, in one example, the second body 21 may be provided with two second magnetic members 24 of opposite magnetic poles on only one side, and the magnetic poles of the second magnetic members 24 provided on the other sides are all the same, and in another example, the second body 21 may be provided with two second magnetic members 24 of opposite magnetic poles on multiple sides, and there is no limitation herein.

Referring to FIG. 10, in some embodiments, the second mechanical coupling interface 2011 includes a second positioning member 25 disposed in the second body 21, while the first mechanical coupling interface 1011 includes a first positioning member 15 disposed in the photographing device 10. The second positioning member 25 is used to combine with the first positioning member 15. The combination of the first positioning member 15 and the second positioning member 25 can provide a positioning function when the photographing device 10 is connected to the second body 21, which facilitates the connection of the two. It is noted that in some embodiments, one of the first positioning member 15 and the second positioning member 25 comprises a positioning post and the other comprises a positioning hole, and the positioning post is at least partially housed in the positioning hole when the photographing device 10 is connected to the expansion component 20. For example, in one example, the first positioning member 15 includes a positioning post and the second positioning member 25 includes a positioning hole, and the positioning post of the first locating member 15 is at least partially housed in the positioning hole of the second locating member 25 when the photographing device 10 is coupled to the expansion member 20. Again, in another example, the first positioning member 15 includes a positioning hole, the second positioning member 25 includes a positioning post, and the positioning post of the second positioning member 25 is at least partially housed within the positioning hole of the first positioning member 15 when the photographing device 10 is connected to the expansion member 20. In addition, the number of first positioning members 15 provided on the first body 11 may be one or more, and is not limited herein.

Referring to FIG. 2 and FIGS. 10 to 13, in some embodiments, the second mechanical coupling interface 2011 further comprises a second coupling member 501 disposed on the second body 21, while the first mechanical coupling interface 1011 comprises a first coupling member 401 disposed on the photographing device 10, and the second coupling member 501 is used to combine with the first coupling member 401 of the photographing device 10 for locking the photographing device 10 with the expansion component 20. This can prevent the expansion component 20 from falling off from the photographing device 10 during the use of the photographing system 100 by the user, thereby increasing the stability of the connection between the expansion component 20 and the photographing device 10.

In some embodiments, the second coupling member 501 includes a snap fastener 51, a connecting rod 53, and an elastic member 52. More specifically, the snap fastener 51 is provided with a snap hook 511 on a side away from the second body 21, so that the snap hook 511 can be at least partially housed in the groove 41 of the first coupling member 401 when the first coupling member 401 is coupled with the second coupling member 501 to avoid the second coupling member 501 from falling off from the first coupling member 401, thereby locking the photographing device 10 and the expansion component 20.

In some embodiments, the second body 21 is provided with a mounting groove 211 on the side wall of the second body 21, and a second mount 2111 is provided in the mounting groove 211. The snap fastener 51 is also provided with a mounting hole 512 and a third mounting member 513, and the mounting hole 512 is nearer to the snap hook 511 than the third mounting member 513. The elastic member 52 comprises a sleeve portion 521, a first connection portion 522 and a second connection portion 523. The connecting rod 53 passes through the sleeve portion 521 and the mounting hole 512 of the snap fastener 51 and is housed in the mounting groove 211 of the side wall of the second body 21, the first connecting portion 522 of the elastic member 52 is coupled with the second mounting member 2111 of the second body 21 so as to connect the first connection portion

522 with the second body 21; the second connection portion 523 of the elastic member 52 is coupled with the third mounting member 513 in combination with the third mounting member 513 of the snap fastener 51 so that the second connection member 523 is connected to the snap fastener 51. In this way the snap fastener 51 is movably provided on the second body 21 and the snap fastener 51 is capable of moving relative to the second body 21 under external force. Specifically, when the snap fastener 51 is subjected to a force, the elastic member 52 undergoes an elastic deformation so that the snap hook 511 is away from the second body 21 and the side of the snap fastener 51 away from the snap hook 511 is closer to the second body 21; when the force exerted on the snap fastener 51 disappears, the elastic restoring force of the elastic member 52 causes the snap hook 511 to be closer to the second body 21 and the side of the snap fastener 51 away from the snap hook 511 is far away from the second body 21.

Figure 5:
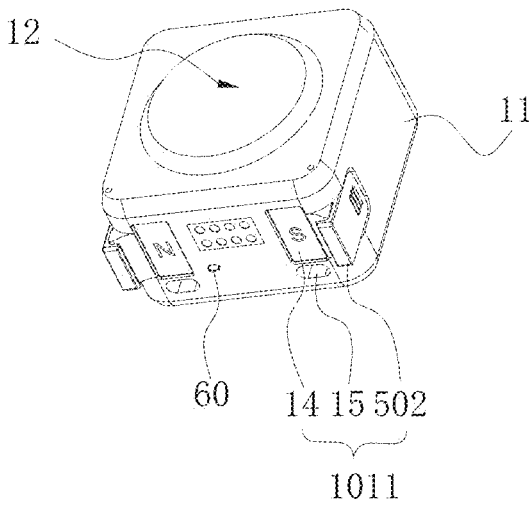
FIG. 5 is a schematic diagram of a structure of a photographing device in some embodiments of the present disclosure.
Figure 6:
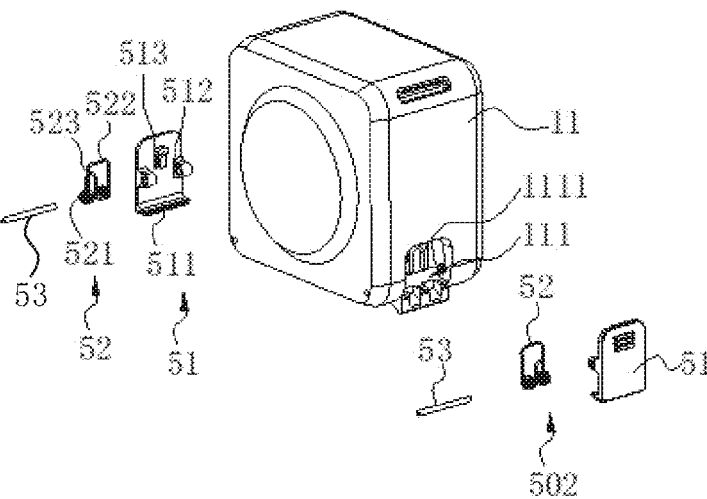
FIG. 6 is a schematic diagram of a structural breakdown of a photographing device in some embodiments of the present disclosure.
Figure 7:
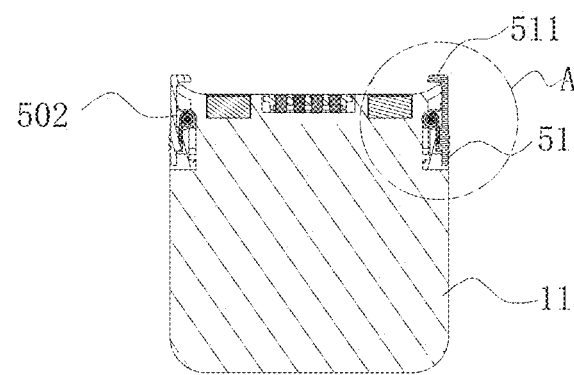
FIG. 7 is a schematic cross-sectional view of a photographing device in some embodiments of the present disclosure.
Figure 8:
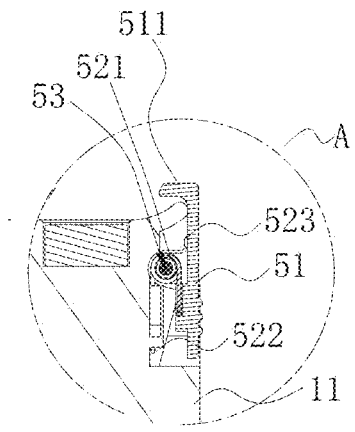
FIG. 8 is an enlarged schematic view of region A of the photographing device of FIG. 7.
Figure 14:
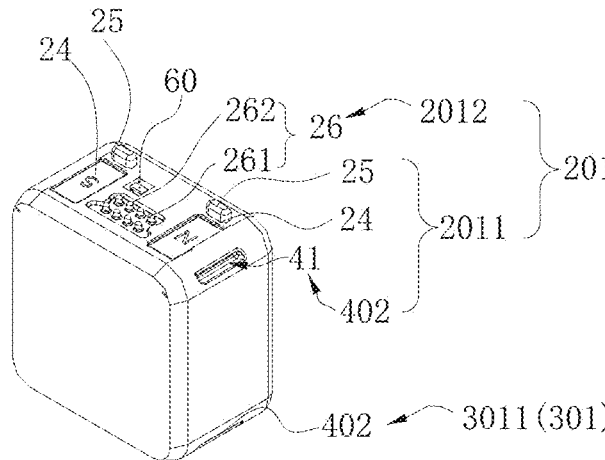
FIG. 14 is a schematic structural diagram of an expansion component in some embodiments of the present disclosure.

Referring to FIGS. 5 and 14, in some embodiments, the second mechanical coupling interface 2011 further comprises a fourth coupling member 402 disposed on the second body 21, while the first mechanical coupling interface 1011 comprises a third coupling member 502 disposed on the photographing device 10, and the fourth coupling member 401 is used to combine with the third coupling member 502 of the photographing device 10 to lock the photographing device 10 to the expanding component 20. This can prevent the expansion component 20 from falling off from the photographing device 10 during the use of the photographing system 100 by the user, thereby increasing the stability of the connection of the expansion component 20 with the photographing device 10.

In some embodiments, the fourth coupling member 402 is provided with a groove 41 such that when the fourth coupling member 402 is coupled to the third coupling member 502 of the expansion member 20, the snap hook 511 of the third coupling member 502 (shown in FIG. 7) is at least partially housed within the groove 41 of the fourth coupling member 402.

It is to be noted that the first body 11 may be provided with only the second coupling member 501, or only the fourth coupling member 402, and of course the first body 11 may be provided with the second coupling member 501 and the fourth coupling member 402. Furthermore, the number of the second coupling member 501 and the fourth coupling member 402 may be one, two, three, four, or even more, none of which is to be limited herein.

In some embodiments, when the photographing device 10 and the expansion component 20 are magnetically connected, and the first body 11 is provided with a first coupling member 401 and the second body 21 is provided with a second coupling member 501; and/or the first body 11 is provided with a third coupling member 502 and the second body 21 is provided with a fourth coupling member 402, the corresponding coupling members on the first body 11 and the second body 21 can be automatically combined to lock the photographing device 10 and the expansion component 20, without the user having to manually exert a force on the snap fasteners 51, respectively. The following is an example of the combination of the first coupling member 401 on the first body 11 and the second coupling member 501 on the second body 21. Exemplarily, referring to FIG. 2 and FIGS. 10 to 13, the first body 11 is provided with a first magnetic member 14 and a first coupling member 401, and the second body 21 is provided with a second magnetic member 24 and a second coupling member 501. When the distance between the first magnetic member 14 and the second magnetic member 24 is less than a predetermined distance, the magnetic force generated by the first magnetic member 14 and the second magnetic member 24 against each other will continuously shorten the distance between the first magnetic member 14 and the second magnetic member 24 until the first body 11 is in contact with the snap fastener 51 of the second coupling member 501 provided on the second body 21. After the first body 11 and the snap fastener 51 are in contact, the magnetic force generated between the first magnetic member 14 and the second magnetic member 24 will cause the first body 11 to apply a force to the snap fastener 51, and at this time, the elastic member 52 of the second coupling member 501 disposed on the second body 21 will undergo an elastic deformation to cause the snap hook 511 of the second coupling member 501 disposed on the second body 21 to be far away from the second body 21, and the side of the fastener 51 away from the hook 511 is closer to the second body 21. Since the snap hook 511 is away from the second body 21, under the action of the magnetic force generated by the first magnetic member 14 and the second magnetic member 24 to each other, it is possible to further shorten the distance between the first body 11 and the second body 21 until the first magnetic member 14 and the second magnetic member 24 are in contact. At the same time, since after the first body 11 does not come into contact with the snap fastener 51, i.e., after the force exerted on the snap fastener 51 disappears, the elastic restoring force of the elastic member 52 of the second coupling member 501 provided on the second body 21 causes the side of the snap fastener 51 away from the snap hook 511 to move away from the second body 21, and the snap hook 511 is closer to the second body 21 and is at least partially housed in the groove 41 of the first coupling member 401 provided on the first body 11 to lock the photographing device 10 with the expansion component 20. In this way, without the need for the user to manually apply a force to the snap fastener 51 of the second coupling member 501, the first coupling member 401 and the second coupling member 501 can be automatically combined to lock the photographing device 10 with the expansion component 20, which improves the convenience of the user in using the photographing system 100. It is to be noted that when the photographing device 10 and the expansion component 20 are magnetically connected, the specific manner in which the third coupling member 502 on the first body 11 is combined with the fourth coupling member 402 on the second body 21 is the same as the specific manner in which the first coupling member 401 on the first body 11 is combined with the second coupling member 501 on the second body 21 when the photographing device 10 and the expansion component 20 are magnetically connected, which will not be repeated herein.

Referring to FIG. 10, in some embodiments, the second quick release interface 201 may also include a second electrical coupling interface 2012, and when the first quick release interface 101 of the photographing device 10 also includes a first electrical coupling interface 1012 (as shown in FIG. 2), and when the second mechanical coupling interface 2011 is coupled to the first mechanical coupling interface 1011 of the photographing device 10, the second electrical coupling interface 2012 is capable of coupling with the first electrical coupling interface 1012 of the photographing device 10 to realize an electrical connection and/or a communication connection between the photographing device 10 and the expansion component 20. It is noted that the second electrical coupling interface 2012 includes at least one of: a contact, a male plug, and a female plug.

Specifically, referring to FIGS. 2 and 10 together, in some embodiments, the second electrical coupling interface 2012 further comprises a second connector 26, which is located on the surface of the expansion component 20, i.e., the surface of the second body 21 is provided with a second connector 26, so that when the photographing device 10 is connected to the expansion component 20, the second connector 26 is able to cooperate with the first connector 16 of the photographing device 10 to realize the communication connection between the photographing device 10 and the expansion component 20. Specifically, in some embodiments, the second connector 26 comprises a third contact 261, wherein the third contact 261 cooperates with the first contact 161 of the photographing device 10 when the photographing device 10 is connected to the expansion component 20 to realize a communication connection between the photographing device 10 and the expansion component 20.

In some embodiments, the second connector 26 further comprises a fourth contact 262, which is capable of cooperating with the second contact 162 of the photographing device 10 when the photographing device 10 is connected to the expansion component 20 to realize an electrical connection between the photographing device 10 and the expansion component 20. Exemplarily, in some embodiments, the first battery 181 is capable of powering the expansion component 20 via the second contact 162 and the fourth contact 262.

In some embodiments, the expansion component 20 may also be communicatively connected to the photographing device 10 via a wireless connection. Exemplarily, the expansion component 20 also includes a wireless communication module, and when the photographing device 10 is connected to the expansion component 20, the expansion component 20 is wirelessly connected to the photographing device 10 via the wireless communication module to realize the communication connection between the two. It is noted that in some embodiments, the expansion component 20 is also capable of realizing an electrical connection between the two by wirelessly connecting with the photographing device 10. In addition, in one example, the photographing device 10 and the expansion component 20 may be both mechanically connected and wirelessly connected to realize a communication connection between the two; of course, in another example, the photographing device 10 and the expansion component 20 may not be mechanically connected but only wirelessly connected, neither of which is limited herein.

Figure 15:
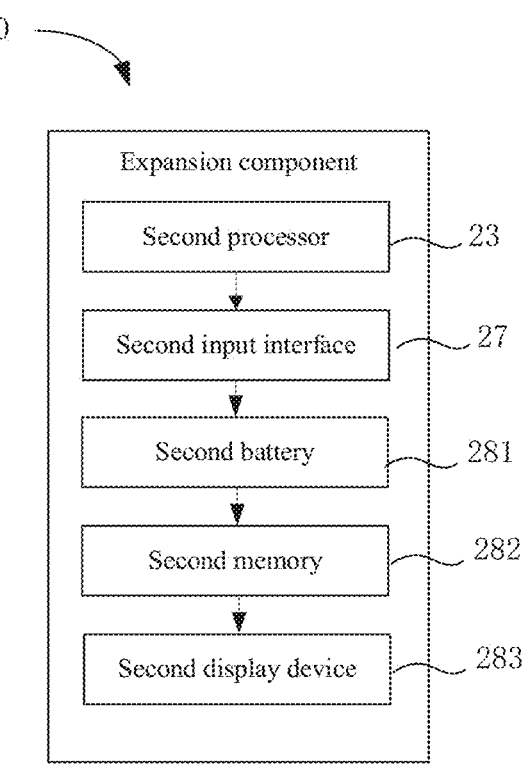
FIG. 15 is a schematic structural diagram of an expansion component in some embodiments of the present disclosure.

Referring to FIG. 15, in some embodiments, the expansion component 20 may further include a second input interface 27. The second input interface 27 is used to generate a second instruction in response to a second input from a user to the expansion component 20. It is noted that the second input interface 27 includes, but is not limited to, at least one of the following: a button, a wheel, a joystick, a microphone, or a touch device. The second input from the user to the photographing device 10 includes, but is not limited to, at least one of the following: a touch input, a press input, a swipe input, a double-tap input, a voice input, or a box-select input. The second input interface 27 and the user's second input to the expansion component 20 referred to below are also explained as such and will not be repeated.

Referring to FIGS. 5 and 10, in some embodiments, the photographing system 100 may further include a detector 60, the detector 60 being used to determine whether the expansion component 20 has been detachably connected to the photographing device 10. Exemplarily, in some embodiments, the detector 60 is electrically coupled to the first processor 13, and the first processor 13 controls the photographing device 10 to switch from the first mode to the second mode when the first processor 13 is in the process of determining that the expansion component 20 has been detachably coupled to the photographing device 10. Wherein the power consumption rate of the photographing device 10 in the second mode is greater than the power consumption rate in the first mode. It is noted that, in one example, the detector 60 may be provided on the photographing device 10 (as shown in FIG. 5), and the detector 60 sends a confirmation message to the first processor 13 after determining that the expansion component 20 has been connected to the photographing device 10, and the first processor 13, upon receiving the confirmation message, i.e., the first processor 13, upon determining that the expansion component 20 has been detachably connected to the photographing device 10, the first processor 13 controls the photographing device 10 to switch from the first mode to the second mode. In another example, the detector 60 may also be provided on the expansion component 20 (as shown in FIG. 10), and the detector 60, after determining that the expansion component 20 has been connected to the photographing device 10, sends an acknowledgement message to the first processor 13 via the first connector 16 and the second connector 26 to the photographing device 10, and the first processor 13, after receiving the acknowledgement message, i.e., when the first processor 13 determines that the expansion component 20 has been detachably connected to the photographing device 10, the first processor 13 controls the photographing device 10 to switch from the first mode to the second mode. In particular, when the photographing device 10 is magnetically connected to the expansion component 20, i.e., when the first mechanical coupling interface 1011 and/or the second mechanical coupling interface 2011 include a magnetic member, the detector 60 may detect the connection state of the expansion component 20 to the photographing device 10 by sensing a change in the magnetic field. For example, the detector 60 may be a Hall sensor, and the Hall sensor is able to determine whether the expansion component 20 has been detachably connected to the photographing device 10. In some embodiments, the detector 60 may also be a pressure switch that is triggered when the first mechanical coupling interface 1011 is coupled to the second mechanical coupling interface 2011. When the pressure switch is triggered, it can be confirmed that the expansion component 20 is detachably coupled to the photographing device 10. Of course, in some embodiments, the detector 60 may also detect the connection state of the expansion component 20 with the photographing device 10 by detecting the distance between the first body 11 and the second body 21. For example, the detector 60 may be an infrared detector, a structured light sensor, or the like, none of which are limited herein.

It is noted that in some embodiments, the first processor 13 of the photographing device 10 may also determine, via the first electrical coupling interface 1012, whether or not the expansion component 20 is detachably coupled to the photographing device 10. Upon the first processor 13 determining, via the first electrical coupling interface 1012, that the expansion component 20 has been detachably connected to the photographing device 10, the first processor 13 controls the photographing device 10 to switch from the first mode to the second mode.

In some embodiments, where the photographing device 10 is coupled to the expansion component 20, the expansion component 20 is capable of providing expansion functionality for the photographing device 10.

Referring to FIG. 2, FIG. 9, FIG. 10, and FIG. 15, in some embodiments, the photographing device 10 may further include a first processor 13, the first processor 13 may be electrically coupled to the image sensor 12 and the first electrically coupled interface 1012. The expansion component 20 may further include a second processor 23, the second processor 23 may be electrically coupled to the second electrically coupled interface 2012. In the case where the photographing device 10 is coupled and connected with the expansion component 20, the second processor 23 is used to control the expansion component 20 to send a second instruction to the photographing device 10, and the first processor 13 is used to control the photographing device 10 to perform an operation that should be performed in accordance with the first instruction entered by a user on the photographing device 10 and the second instruction received, the operation comprising controlling the image sensor 12 to capture a first image.

In one embodiment, when the first mechanical coupling interface 1011 of the photographing device 10 is coupled to the second mechanical coupling interface 2011 of the expansion component 20, the first electrical coupling interface 1012 of the photographing device 10 is coupled to the second electrical coupling interface 2012 of the expansion component 20, so as to realize the coupling connection between the photographing device 10 and the expansion component 20. The first input interface 17 of the photographing device 10 generates a first instruction in response to a first input from a user to the photographing device 10. The second input interface 27 of the expansion component 20 generates a second instruction in response to a second input from the user to the expansion component 20. In some embodiments, the second instructions are transmitted to the first processor 13 via the second electrical coupling interface 2012 and the first electrical coupling interface 1012. Exemplarily, the first electrical coupling interface 1012 comprises a first connector 16 disposed to the photographing device 10, and the second electrical coupling interface 2012 comprises a second connector 26 disposed to the expansion component when the first contact 161 on the first connector 16 is connected to the third contact 261 on the second connector 26 to cooperate to realize a communication connection between the photographing device 10 and the expansion component 20. As such, the second processor 23 can control the expansion component 20 to send a second instruction to the photographing device 10 via the third contact 261 and the first contact 161. Of course, in some embodiments, if the photographing device 10 and the expansion component 20 are connected by wireless communication (at this time, the expansion component 20 may not have the second electrical coupling interface 2012, or at this time, the first electrical coupling interface 1012 and the second electrical coupling interface 2012 may not be coupled), the second processor 23 may also control the expansion component 20 to send the second instruction to the photographing device 10 by way of wireless communication, which is not limited herein.

In one embodiment, the first processor 13 is used to control the photographing device 10 to perform a corresponding operation based on the first instruction as well as the second instruction. Exemplarily, the first processor 13 is further used to determine a time at which the first instruction as well as the second instruction are acquired, and to determine the execution of the corresponding operation based on the generation time of the first instruction as well as the second instruction.

Further, in some embodiments, when the time of acquiring the first instruction as well as the time of the second instruction are the same, the first processor 13 is further used to control the photographing device 10 to perform the first operation according to the first instruction and the second instruction. When the time of acquiring the first instruction as well as the time of the second instruction are different, the first processor 13 is also used to perform the second operation according to the first instruction and/or perform the third operation according to the second instruction. It can be understood that when the time of acquiring the first instruction and the time of acquiring the second instruction are the same, it indicates that the user wants to utilize the combination of the first instruction and the second instruction to form a new instruction, and therefore the first processor 13 controls the photographing device 10 to perform the first operation when the first instruction and the second instruction are acquired at the same time. When the first instruction and the second instruction are acquired at different times, it indicates that the user does not want to utilize the combination of the first instruction and the second instruction to form a new instruction. At this time, in one embodiment, when the first instruction and the second instruction are acquired at different times, the first processor 13 may control the photographing device 10 to perform the corresponding operation according to the first acquired instruction. For example, if the time of acquiring the first instruction is earlier than the time of acquiring the second instruction, the first processor 13 controls the photographing device 10 to perform a second operation according to the first instruction; or if the time of acquiring the second instruction is earlier than the time of acquiring the first instruction, the first processor 13 controls the photographing device 10 to perform a third operation according to the second instruction. Of course, the first processor 13 may also control the photographing device 10 to perform a corresponding operation according to the later acquired instruction. In particular, in another embodiment, the first processor 13 may also control the photographing device 10 to perform the corresponding operation in sequence according to the time of the acquired instruction. For example, if the time of acquiring the first instruction is earlier than the time of acquiring the second instruction, the first processor 13 first controls the photographing device 10 to perform the second operation according to the first instruction, and then controls the photographing device 10 to perform the third operation according to the second instruction.

It is to be noted that the first operation, the second operation, and the third operation may all include, but are not limited to, at least one of the following: a photographing operation, a zooming operation, a display mode switching operation, a photographing mode switching operation, a focusing operation, a brightness adjustment operation, or a volume adjustment operation, but it is to be noted that the first operation is different from the second operation and the third operation. Exemplarily, the first operation may include a photographing mode switching operation, the second operation includes a photographing operation, and the third operation includes a volume operation. For example, the third operation includes turning up the volume, at which time the first processor 13 controls the photographing device 10 to turn up the volume if the photographing device 10 needs to perform the third operation.

In some embodiments, when an absolute value of the difference in time between the first instruction and the second instruction is acquired to be less than or equal to a preset time threshold, the first processor 13 is further used to control the photographing device 10 to perform the first operation according to the first instruction and the second instruction. When the absolute value of the difference between time of the first instruction to be acquired and time of the second instruction to be acquired is greater than the preset time threshold, the first processor 13 is further used to perform the second operation according to the first instruction and/or perform the third operation according to the second instruction. Even if the user wishes to form a new instruction using the combination of the first instruction and the second instruction to instruct the recording device 10 to perform the corresponding operation, the time for acquiring the first instruction and the second instruction may not be the same due to the difference in the agility of the user's left and right hands, or due to the possible deviation in the time for different input interfaces (including the first input interface 17 and the second input interface 27) to respond to the user's inputs to generate the instruction. By adopting whether the absolute value of the difference between the time of acquiring the first instruction and the time of the second instruction is less than or equal to a predetermined time threshold to determine whether to execute the first operation, the operation executed by the photographing device 10 can be more in line with the user's expectation than executing the first operation only when the time of acquiring the first instruction and the time of the second instruction are the same. It is to be noted that when the absolute value of the difference between the time of the first instruction and the time of the second instruction is obtained is greater than a predetermined time threshold, the first processor 13 is also used to perform the second operation in accordance with the first instruction and/or perform the third operation in accordance with the second instruction in the same manner as in the above embodiment when the time of the first instruction and the time of the second instruction is obtained is different. The specific implementation of performing the second operation and/or performing the third operation according to the second instruction is the same as the specific implementation of the above embodiment in which the first processor 13 is also used to perform the second operation according to the first instruction when the time of the acquisition of the first instruction and the time of acquisition of the second instruction are different, which is not described herein.

In some embodiments, in the case where the photographing device 10 is connected to the expansion component 20, the user may also individually input a second input only to the second input interface 27 of the expansion component 20, and the second input interface 27 is capable of generating a second instruction based on the second input. After the second processor 23 sends the generated second instruction to the first body 11, the first processor 13 directly controls the photographing 10 to perform the corresponding operation according to the second instruction. In this way, when the user is not convenient to input the instruction to the first input interface 17, the user can directly input the instruction to the expansion device 20 to control the photographing device 10 to perform the corresponding operation, thereby enhancing the convenience of the user in using the photographing system 100. In particular, in some embodiments, the same expansion component 20 can be connected to multiple photographing devices 10 (including wireless connection and detachable connection, as long as it can be connected by communication), and at this time, if the user inputs a second input to the second input 27 interface of the expansion component 20, the second input interface 27 can generate a second instruction based on the second input, and the second processor 23 sends the generated second instruction to all of the second input interfaces with the expansion component 20 The second processor 23 sends the generated second instruction to all the first bodies 11 communicatively connected to the expansion component 20, and the first processors 13 of all the photographing devices 10 are able to control the photographing devices 10 to perform the corresponding operations according to the second instruction. This enables a plurality of photographing devices 10 to perform the same operation at the same time, increasing the disclosure scenarios in which the user can use the photographing system 100, thereby enhancing the user's experience of using the photographing system 100. For example, if the user needs to take pictures of a plurality of photographing devices 10 at the same time toward different angles, then only one expansion component 20 needs to be communicatively connected to the plurality of photographing devices 10, and the user only needs to generate a second instruction to the second input of the expansion component 20 to instruct the photographing devices 10 to start taking pictures, and the second processor 23 is able to send the second instruction to each photographing device 10 communicatively connected to the expansion component 20, and each photographing device 10 performs a corresponding operation. The second processor 23 can send the second instruction to each of the photographing devices 10 communicatively connected to the expansion component 20, and the first processor 13 of each of the photographing devices 10 will control the corresponding photographing device 10 to start taking pictures, thereby realizing simultaneous photographing of the plurality of photographing devices 10 facing different angles.

Of course, in some embodiments, the photographing device 10 also includes a third input interface, and in the case where the photographing device 10 is connected to the expansion component 20, the third input interface is used to generate a third instruction in response to a third input from the user to the photographing device 10. If the photographing device 10 is provided with the first connector 16 and the expansion component is provided with the second connector 26, a first contact 161 on the first connector 16 cooperates with the third contact 261 on the second connector 26 to realize a communication connection between the photographing device 10 and the expansion component 20, so that the first processor 13 can control the photographing device 10 to send the third instruction to the expansion component 20 via the third contact 261 and the first contact 161. Of course, in some embodiments, if the photographing device 10 and the expansion component 20 are wirelessly communicatively connected, the first processor 13 may also control the photographing device 10 to send the third instruction to the expansion component 20 by means of wireless communication, which is not limited herein. After the second processor 23 receives the third instruction, the second processor 23 is also used to control the expansion component 20 to perform a corresponding operation according to the third instruction. In this way, the user is also able to directly control the expansion component 20 to perform the corresponding operation by inputting instructions to the photographing device 10, thereby enhancing the convenience of the user in using the photographing system 100. It should be noted that the third input interface of the photographing device 10 may or may not be the same input interface as the first input interface 17, which is not limited herein.

In some embodiments, in the case where the photographing device 10 is coupled with the expansion component 20, the expansion component 20 can expand functionality for the photographing device 10. Specifically, referring to FIG.

2, FIG. 9, FIG. 10, and FIG. 15, in some embodiments, the photographing device 10 may further include a first processor 13 and a first battery 181, the first processor 13 may be electrically coupled to the image sensor 12, the first electrical coupling interface 1012, and the first battery 181. The expansion component 20 may further include a second processor 23 and a second battery 281, the second processor 23 may be electrically connected to the second battery 281 and the second electrical coupling interface 2012. In the case where the photographing device 10 is connected to the expansion component 20, the second processor 23 is used to send the second power level information of the second battery 281 to the first processor 21; the first processor 13 is used to control the first battery 181 to charge the second battery 281 according to the obtained first power level information of the first battery 181 and the second power level information, so as to balance the power level of the first battery 181 and the power level of the second battery 281; alternatively, the second processor 23 is used to send the second power quantity information of the second battery 281 to the first processor 13; the first processor 13 is used to send a charging instruction to the expansion component 20 in accordance with the second power quantity information; the second processor 23 is also used to control the second battery 281 to charge the first battery 181 in accordance with the charging instruction to balance the power level of the first battery 181 with the power level of the second battery 281.

In some embodiments, when the first mechanical coupling interface 1011 of the photographing device 10 is coupled with the second mechanical coupling interface 2011 of the expansion component 20, the first electrical coupling interface 1012 of the photographing device 10 is coupled with the second electrical coupling interface 2012 of the expansion component 20, so as to realize the coupling connection between the photographing device 10 and the expansion component 20. In some embodiments, the second power level information is transmitted to the first processor 13 via the second electrical coupling interface 2012 and the first electrical coupling interface 1012. Exemplarily, the first electrical coupling interface 1012 comprises a first connector 16 disposed at the photographing device 10, and the second electrical coupling interface 2012 comprises a second connector 26 disposed at the expansion component 20, and the first contact 161 on the first connector 16 and the third contact 261 on the second connector 26 are connected to realize a communication connection between the photographing device 10 and the expansion component 20, thereby enabling the photographing device 10 to receive the second power information sent by the expansion component 20 via the third contact 261 of the second connector 26 and the first contact 161 of the first connector 16. Similarly, in some embodiments, the charging indication is transmitted to the second processor 23 via the first electrical coupling interface 1012 and the second electrical coupling interface 2012. Exemplarily, the first electrical coupling interface 1012 comprises a first connector 16 disposed at the photographing device 10, and the second electrical coupling interface 2012 comprises a second connector 26 disposed at the expansion component 20. When the first contact 161 on the first connector 16 is connected to the third contact 261 on the second connector, the first contact 161 on the first connector 16 cooperates with the third contact 261 on the second connector 26 to realize a communication connection between the photographing device 10 and the expansion component 20, thereby enabling the photographing device 10 to send charging instructions to the expansion component 20 via the first contact 161 of the first connector 16 and the third contact 261 of the second connector 26. The second contact 162 of the first connector 16 cooperates with the fourth contact 262 of the second connector 26 to realize an electrical connection between the photographing device 10 and the expansion component 20, so as to enable the first battery 181 to charge the second battery 281 via the second contact 162 and the fourth contact 262, or to enable the second battery 281 to charge the first battery 181 via the fourth contact 262 and the second contact 162.

Of course, in some embodiments, if the photographing device 10 and the expansion component 20 are wirelessly connected (at this time, the expansion component 20 may not have the second electrical coupling interface 2012, or at this time, the first electrical coupling interface 1012 and the second electrical coupling interface 2012 may not be coupled with each other), the photographing device 10 may also receive, by means of wireless communication, the second power level information sent by the expansion component 20, and send a charging indication to the expansion component 20. In particular, in some embodiments, the photographing device 10 may also realize an electrical connection between the two, i.e., a wireless charging function between the two, by means of wireless connection with the expansion device 20, so as to enable the first battery 181 to wirelessly charge the second battery 281, or to enable the second battery 281 to wirelessly charge the first battery 181, neither of which is limited herein.

Further, in some embodiments, the first processor 13 controls the first battery 181 to charge the second battery 281 based on the remaining power of the first battery 181 and the remaining power of the second battery 281; or, sends a charging instruction to instruct the second battery 281 to charge the first battery 181. Exemplarily, the first power level information includes the remaining power level of the first battery 181, and the second power level information includes the remaining power level of the second battery 281. In the case where the photographing device 10 is connected to the expansion component 20, the second processor 23 of the expansion component 20 sends the second power level information to the photographing device 10, and if the remaining power level of the first battery 181 is greater than the remaining power level of the second battery 281, the first processor 13 controls the first battery 181 to charge the second battery 281; if the remaining power level of the first battery 181 is less than the remaining power level of the second battery 281, the first processor 13 sends a charging indication to the expansion component 20 to instruct the second battery 281 to charge the first battery 181. After the expansion component 20 receives the charging indication, the second processor 23 controls the second battery 281 to charge the first battery 181.

It can be understood that when the remaining power level of any one of the photographing device 10 and the expansion component 20 is 0, the photographing device 10 or the expansion component 20 with a remaining power level of 0 cannot work normally, and there is no way to communicate and connect between the photographing device 10 and the expansion component 20, resulting in the photographing system 100 not being able to be used normally, which may affect the user's normal use of the photographing system 100. However, by controlling the battery with a larger remaining power in the first battery 181 and the second battery 281 to charge the battery with a smaller remaining power, the embodiment can balance the remaining power level of the first battery 181 and the remaining power level of the second battery 281, thereby avoiding a situation in which one of the photographing device 10 and the expansion component 20 has a lot of remaining power and the other has zero remaining power, and thus enhancing the experience of the user in using the photographing system 100.

In some embodiments, the first processor 13 controls the first battery 181 to charge the second battery 281 based on the remaining operating time of the first battery 181 and the remaining operating time of the second battery 281; alternatively, a charging instruction is sent to instruct the second battery 281 to charge the first battery 181. Exemplarily, the first power information may also include the remaining power of the first battery 181 and the first power consumption rate in the current operating mode; and the second power information may also include the remaining power of the second battery 281 and the second power consumption rate in the current operating mode. In the case where the photographing device 10 is connected to the expansion component 20, the second processor 23 of the expansion component 20 sends the second power quantity information to the photographing device 10. After the first processor 13 receives the second power quantity information, the first processor 10 is also used to determine a first remaining operating time of the photographing device 10 based on the remaining power quantity of the first battery 181 and the first power consumption rate in the first power quantity information; based on the remaining power of the second battery 281 and the second power consumption rate in the second power quantity information, to determine a second remaining operating time of the expansion component 20. If the first remaining operating time is longer than the second remaining operating time, the first processor 13 controls the first battery 181 to charge the second battery 281. If the first remaining operating time is less than the second remaining operating time, the first processor 13 sends a charging indication to the expansion component 20 to instruct the second battery 281 to charge the first battery 181. After the expansion component 20 receives the charging indication, the second processor 23 controls the second battery 281 to charge the first battery 181. It is to be noted that the remaining operating times of the photographing device 10 and the expansion component 20 are determined by their remaining power and corresponding power consumption rates. The larger the remaining power and the smaller the power consumption rate, the larger the remaining operating time. Conversely, the smaller the remaining power and the larger the power consumption rate, the smaller the remaining operating time.

It can be understood that when the remaining operating times of any one of the photographing device 10 and the expansion component 20 is 0, it means that the photographing device 10 or the expansion component 20 with a remaining operating time of 0 cannot work normally, and there is no way to communicate and connect between the photographing device 10 and the expansion component 20, resulting in the photographing system 100 not being able to be used normally, and this will affect the normal use of the photographing system 100 by the user. This embodiment can balance the power of the first battery 181 and the second battery 281 by controlling the one of the photographing device 10 and the expansion component 20 with a larger remaining operating time to charge the one with a smaller remaining operating time, so that the remaining operating time of the photographing device 10 is equal to that of the expansion component 20, thereby avoiding the situation in which the one of the photographing device 10 and the expansion component 20 is able to work normally and the other is not able to work normally, and improving the user's ability to use the photographing system 100.

Of course, in some embodiments, only the second battery 281 charges the first battery 181, and the first battery 181 does not charge the second battery 281. It can be understood that the expansion component 20 in the photographing system 100 is only for expanding the functions of the photographing device 10, and if the expansion component 20 does not work properly, the photographing system 100 is able to acquire images normally although it lacks some of the functions; whereas if the photographing device 10 does not work properly, the photographing system 100 is not able to acquire images normally. Therefore, in this embodiment, the expansion component 20 charges the photographing device 10, and the photographing device 10 is not able to charge the expansion component 20, which can maximize the guarantee that the photographing device 10 can work normally and maintain the basic function (acquiring images) of the photographing system 100.

In some embodiments, in the case where the photographing device 10 is connected to the expansion component 20, the expansion component 20 can expand functionality for the photographing device 10. Specifically, referring to FIG. 2, FIG. 9, FIG. 10, and FIG. 15, in some embodiments, the photographing device 10 can further include a first processor 13, the first processor 13 can be electrically connected to the image sensor 12 and the first electrically-coupled interface 1012, and the expansion component 20 can further include a second processor 23, the second processor 23 can be electrically connected to the second electrically-coupled interface 2012. In the case where the photographing device 10 is connected to the expansion component 20, the first processor 13 is used to store the first image of the image sensor 12 in the photographing device 10 and/or the expansion component 20.

In some embodiments, in the case where the photographing device 10 is connected to the expansion component 20, the second processor 23 controls the expansion component 20 to generate parameter information of the expansion component 20 to the photographing device 10, the parameter information including whether or not the expansion component 20 is provided with a second memory 282. If the expansion component 20 is not provided with a second memory 282, the first processor 13 is also used to store the first image in the first memory 182, i.e. the first processor 13 controls the photographing device 10 to store the first image in the first memory 182. If the expansion component 20 is provided with a second memory 282, the first processor 13 stores the first image in the second memory 282. Exemplarily, if the expansion component 20 is provided with a second memory 282, the first processor 13 controls the photographing device 10 to send the first image to the expansion component 20, and upon receiving the first image, the second processor 23 controls the expansion component 20 to store the first image in the second memory 282. Since the storage space of the first memory 182 in the photographing device 10 is limited, if the expansion component 20 is provided with the second memory 282, storing the first image in the second memory 282 of the expansion component 20 can increase the storage space of the photographing system 100.

In particular, in some embodiments, if the expansion component 20 is provided with a second memory 282, the first processor 13 is further used to be able to store in the first memory 182 and/or the second memory 282 based on the user input. Where the expansion component 20 is provided with the second memory 282, the input can be selected by the user to be in the first memory 182 or in the second memory 282. Among other things, the user may input the storage instruction via the first input interface 17 of the photographing device 10, and the user may also input the storage instruction via the second input interface 27 of the expansion component 20, and the second processor 23 controls the expansion component 20 to send the storage instruction to the photographing device 10, and the storage instruction is used to indicate a storage location of the first image. If the storage instruction indicates that the first image is stored in the first memory 182, the first processor 13 controls the photographing device 10 to store the first image in the first memory 182; if the storage instruction indicates that the first image is stored in the second memory 282, the first processor 13 controls the photographing device 10 to send the first image to the expansion component 20, and upon receiving the first image, the second processor 23 controls the expansion component 20 to store the first image in the second memory 282. As the first image is stored in the first memory 182 and/or the second memory 282 based on user input when the expansion component 20 is provided with the second memory 282, it is possible to increase the interaction with the user while the storage space of the photographing system 100 is available, so that the storage location of the first image can meet the expectation of the user, which further enhances the user's experience of using the photographing system 100.

It is noted that, in some embodiments, the specific implementation of the expansion component 20 sending parameter information to the photographing device 10 is the same as the specific implementation of the expansion component 20 sending second power level information to the photographing device 10 in the above embodiments. The specific implementation of the photographing device 10 sending a first image to the expansion component 20 is the same as the specific implementation of the photographing device 10 sending a charging indication to the expansion component 20 in the above embodiments, and is not described herein.

In some embodiments, if the photographing device 10 is provided with a first connector 16 and the expansion component 20 is provided with a second connector 26, the first connector 16 may also include a fifth contact, and the second connector 26 may also include a sixth contact. In the case where the photographing device 10 is connected to the expansion component 20, the fifth contact cooperates with the sixth contact, which is also capable of realizing a communication connection between the expansion component 20 and the photographing device 10, i.e., data can be transmitted between the photographing device 10 and the expansion component 20 through the fifth contact and the sixth contact. Wherein, the communication link formed by the cooperation of the fifth contact and the sixth contact is capable of transmitting a larger amount of data as compared to the communication link formed by the first contact 161 and the third contact 261. The photographing device 10 sends the first image to the expansion member 20 via the fifth contact and the sixth contact. Since the communication link capable of transmitting larger data is used to transmit the first image, the transmission speed of the first image can be increased.

In some embodiments, in the case where the photographing device 10 is connected to the expansion component 20, the expansion component 20 is capable of expanding functionality for the photographing device 10. Specifically, referring to FIG. 1, in some embodiments, the expansion component 20 can further include a second display device 283 for displaying a first image, and/or displaying a GUI interface of the photographing device 10, in the case where the expansion component 20 is connected to the photographing device 10. Exemplarily, the photographing device 10 sends the first image and/or the GUI interface information of the photographing device 10 to the expansion component 20, and the expansion component 20 receives the first image and/or the GUI interface information of the photographing device 10 and displays it via the second display device 283. It is noted that the specific implementation of the photographing device 10 sending the first image and/or the GUI interface information of the photographing device 10 to the expansion component 20 is the same as the specific implementation of the photographing device 10 sending the first image to the expansion component 20 in any of the above embodiments, and will not be repeated herein.

Further, in one example, as shown in FIG. 1, when the expansion component 20 is connected to the photographing device 10, the second display 283 of the expansion component 20 is oriented in the same direction as the incoming light of the image sensor 12. This facilitates the user to adopt the photographing system 100 for taking selfies. Of course, in another example, the orientation of the second display device 283 of the expansion component 20, when the expansion component 20 is connected to the photographing device 10, may also be opposite to the direction of incoming light of the image sensor 12, and is not limited herein. In this regard, the facing direction of the second display device 283 is the side on which the second display device 283 is capable of displaying a picture.

Referring to FIGS. 9 and 15, in some embodiments, when the photographing device 10 is provided with the first display device 183, in the case where the expansion component 20 is connected to the photographing device 10, the second display device 283 of the expansion component 20 is oriented in the same direction as the first display device 183, and the first display device 183 and the second display device 283 together display the first image and/or display the GUI interface of the photographing device 10. The use of the first display device 183 and the second display device 283 for joint display enables the display screen to be enlarged for the benefit of the user's viewing as compared to the display using only a single display device (the first display device 183 or the second display device 283), thereby enhancing the comfort level for use of the photographing system 100. Of course, in some embodiments, the orientation of the second display device 283 of the expansion component 20 may also be opposite to the orientation of the first display device 183 in the case where the expansion component 20 is connected to the photographing device 10, and this is not limited herein.

In some embodiments, the second body 21 of the expansion component 20 may also be provided with an image sensor, and the image sensor of the expansion component 20 is used to acquire the second image. In this way, when the expansion component 20 is detachably connected to the photographing device 10, it is able to acquire both the first image and the second image. In some embodiments, when the expansion component 20 is detachably connected to the photographing device 10, the direction of incoming light of the image sensor of the expansion component 20 is the same as the direction of incoming light of the image sensor 12 of the photographing device 10, so that the first image and the second image in the same direction are acquired. In some embodiments, when the expansion member 20 is detachably connected to the photographing device 10, the direction of incoming light of the image sensor of the expansion component 20 is not the same as the direction of incoming light of the image sensor 12 of the photographing device 10, so as to obtain the first image and the second image in different directions.

In some embodiments, in the case where the photographing device 10 is connected to the expansion component 20, the functions that the expansion component 20 is capable of expanding for the photographing device 10 include at least one of the following: the photographing device 10 is capable of performing a corresponding operation based on a first input of a user on the photographing device 10 and a second input on the expansion component 20; the photographing device 10 is capable of charging the expansion component 20 and/or the expansion component 20 is capable of charging the photographing device 10 to balance the power of the photographing device 10 and the expansion component 20; the first image acquired by the photographing device 10 can be stored in the photographing device 10 and/or the expansion component 20; the expansion component 20 can display the first image, and/or display a GUI interface of the photographing device 10. It can be understood that in the case where the photographing device 10 is connected to the expansion component 20, if the expansion component 20 is capable of implementing its expansion function, it is necessary for the photographing device 10 to know the expansion function of the expansion component 20 connected to it, so as to be able to turn on the corresponding function to cooperate with the expansion component 20. For example, assuming that the photographing device 10 is connected to the expansion component 20, the photographing device 10 is capable of charging the expansion component 20 and/or the photographing device 10 is capable of displaying the first image and/or displaying the GUI interface. The expansion component 20 is able to charge the photographing device 10 to balance the power of the photographing device 10 and the expansion component 20. Since the photographing device 10 and the expansion component 20 need to be charged with each other, i.e., they need to be at least electrically connected to each other to be able to implement the expansion function of the expansion component 20. Thus, when the photographing device 10 knows that it is connected to the expansion component 20, the photographing device 10 turns on all functions related to the electrical connection in order to be able to electrically connect to the expansion component 20. Thus, in some embodiments, where the photographing device 10 is connected to the expansion component 20, the photographing device 10 also authenticates and recognizes the expansion component 20 so that the photographing device 10 knows what expansion features the expansion component 20 connected to it has.

In some embodiments, when the photographing device 10 is in communication with the expansion component 20, the first processor 13 of the photographing device 10 is further used to obtain key information of the expansion component 20; obtain a type of the expansion component 20 after authentication of the key information is qualified; and control the photographing device 10 to turn on a function corresponding to the type according to the type of the expansion component 20. Exemplarily, when the expansion component 20 is connected to the photographing device 10, the photographing device 10 is caused to communicate with the expansion component 20. At this time, the expansion component 20 first sends key information to the photographing device 10, and the first processor 13 of the photographing device, after obtaining the key information, verifies whether the key information is authenticated. It should be noted that if the key information of the expansion component 20 is certified as qualified, it means that the expansion component 20 is capable of pairing with the photographing device 10, i.e., the expansion component 20 that is certified as qualified with the key information is a legal expansion part; if the key information of the expansion component 20 is not certified as qualified, it means that the expansion component 20 is not capable of pairing with the photographing device 10, i.e., the expansion component 20 that is certified as unqualified with the key information is an illegal expansion component. If the key information authentication of the expansion component 20 is unqualified, the expansion component 20 cannot be paired with the photographing device 10, i.e., the expansion component 20 with unqualified key information authentication is an illegal expansion component. Since the key information authentication is added, and the subsequent steps can be carried out only after the authentication is qualified, the photographing device 10 can be prevented from connecting with the illegal expansion component, and the security of the photographing system 100 is improved.

After the key information is authenticated, the first processor 13 obtains the type of the expansion component 20. In one example, after the key information is authenticated, the first processor 13 sends a query instruction to the expansion component 20 to instruct the expansion component 20 to send an expansion function it has. After the first processor 13 receives the expansion feature that the expansion component 20 sends that it has, the first processor 13 confirms the type of the expansion component 20 based on the expansion feature that the expansion component 20 has. In another example, after the key information is authenticated, the first processor 13 sends a query instruction to the expansion component 20, and the expansion component 20, after receiving the query instruction, is able to send its type directly to the photographing device 10. Of course, the first processor 13 is also capable of obtaining the type of the expansion component 20 connected thereto by other means, and is not limited herein. It is to be noted that the expansion functions of the expansion component 20 of the same type are all the same. For example, in the case of the expansion component 20 of the type of charging kit, in the case where the photographing device 10 is connected to the expansion component 20, the expansion component 20 is capable of expanding the functions for the photographing device 10, including: the photographing device 10 is capable of executing a corresponding operation based on a first input of a user on the photographing device 10 and a second input on the expansion component 20; the photographing device 10 is capable of charging the expansion component 20 and/or the expansion component 20 is capable of charging the photographing device 10 to balance the power of the photographing device 10 and the expansion component 20. As another example, the expansion component 20 is of the type of expansion component with screen base, in the case where the photographing device 10 is connected to the expansion component 20, the expansion component 20 is capable of expanding the functions for the photographing device 10, including: the photographing device 10 is capable of executing a corresponding operation based on the first input of the user on the photographing device 10 and the second input on the expansion component 20; the photographing device 10 is capable of charging the expansion component 20 and/or the expansion component 20 is capable of charging the photographing device 10 to balance the power levels of the photographing device 10 and the expansion component 20. The first image acquired by the photographing device 10 can be stored in the photographing device 10 and/or the expansion component 20; and the expansion component 20 can display the first image and/or display a GUI interface of the photographing device 10.

After obtaining the type of the expansion component 20, the first processor 13 controls the photographing device 10 to turn on the functions corresponding to the type of the expansion component 20 connected to it, based on the type of the expansion component 20. Specifically, in some embodiments, the first processor 13, based on the type of the expansion component 20, is able to acquire all expansion functions that the expansion component 20 has. After acquiring all the expansion functions that the expansion component 20 has, the first processor 13 acquires a function of the photographing device 10 corresponding to a certain expansion function according to the expansion function that the expansion component 20 has, and the expansion component 20 is able to realize the expansion function only when the function is turned on. Subsequently, the first processor 13 controls the photographing device 10 to turn on the corresponding function to cooperate with the expansion component 20.

In some embodiments, where the photographing device 10 is coupled to the expansion component 20, the expansion component 20 is capable of expanding the scenarios in which the photographing device 10 can be used.

In some embodiments, where the photographing device 10 is connected to the expansion component 20, the photographing device 10 is capable of being detachably connected to other externally connected devices via the expansion component 20 to expand the scenarios of use of the photographing device 10. Exemplarily, as shown in FIGS. 16 to 19, in some embodiments, the second body 21 of the expansion component 20 includes a base 212. One side of the base 212 is used to carry the photographing device 10 and is capable of being magnetically coupled to the first body 11 of the photographing device 10. The other side of the base 212 can be detachably connected to other external devices. In this way, the photographing device 10 can be detachably mounted on different external devices through the expansion component 20, expanding the use scenarios of the photographing device 10, thereby increasing the disclosure scenarios of the photographing system 100, and increasing the utilization rate of the user using the photographing system 100.

Figure 16:
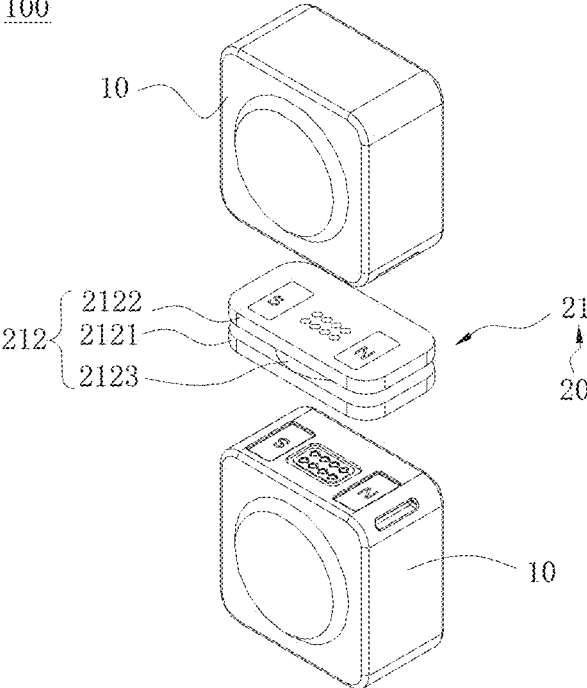
FIGS. 16 through 19 are exploded schematic views of structures of a photographing system in some embodiments of the present disclosure.

Further, referring to FIG. 16, in some embodiments, the base 212 may include a support member 2121 and a first connecting member 2122. The support member 2121 includes back-to-back first sides 21211 and second sides 21212, and the first connecting member 2122 is disposed on the first side of the support member 2121. The first body 11 of the photographing device 10 is also capable of being magnetically connected to the side of the first connecting member 2122 away from the support member 2121, and the position of the first body 11 relative to the support member 2121 is adjustable. Since the position of the first body 11 relative to the support member 2121 is adjustable, this enables the photographing device 10 to capture images in multiple directions even when the support member 2121 is fixed to other external devices, thereby expanding the use scenarios of the photographing system 100.

Specifically, in some embodiments, the first body 11 is provided with a first magnetic member 14, and a second magnetic member 24 is provided on a side of the first connecting member 2122 away from the supporting member 2121, wherein any portion of the first magnetic member 14 is capable of being magnetically connected to any position of the second magnetic member 24. That is, as long as part of the first magnetic member 14 is magnetically connected to the second magnetic member 24, the first body 11 can be magnetically connected to the first connecting member 2122. In this way, the user can change the position of the first magnetic member 14 magnetically connected to the second magnetic member 24 as needed, thereby changing the relative position of the first body 11 and the first connecting member 2122, thereby realizing an adjustable position of the first body 11 relative to the support member 2121. In particular, in some embodiments, the first connection member 2122 is movably connected to the support member 2121, and the first connection member 2122 is capable of rotating relative to the support member 2121. The first body 11, after being magnetically connected to the first connecting member 2122, remains relatively fixed to the first connecting member 2122, and the first connecting member 2122 is capable of driving the first body 11 to rotate relative to the support member 2121 to realize the adjustable position of the first body 11 relative to the support member 2121. In this way, after the first body 11 is magnetically connected to the first connecting member 2122, the user does not need to disassemble the first body 11 from the first connecting member 2122 to change the position and then reinstall it, and only needs to rotate the first connecting member 2122 to realize that the position of the first body 11 relative to the support member 2121 can be adjusted, so that the photographing device 10 is able to capture images in multiple directions to expand the photographing The photographing system 100 can also reduce the difficulty of the user in operating the photographing system 100 and improve the convenience of the user in using the photographing system 100 while the photographing device 10 can capture images in multiple directions to expand the photographing scenes.

In addition, in some embodiments, the base 212 may also include a second connecting member 2123, the second connecting member 2123 is provided on a second side of the support member 2121, and the side of the second connecting member 2123 away from the support member 2121 is capable of removably connecting with other external devices to expand the use scenarios of the photographing device 10. In particular, in some embodiments, the external device connected to the second connecting member 2123 is also capable of having an adjustable position relative to the support member 2121. The specific implementation of realizing the adjustable position of the external access device relative to the support member 2121 is the same as the specific implementation of realizing the adjustable position of the first body 11 relative to the support member 2121, and will not be repeated herein. Wherein, when the first connecting member 2122 is capable of rotating relative to the support member 2121 and the second connecting member 2123 is also capable of rotating relative to the support member 2121, the first connecting member 2122 and the second connecting member 2123 may be coaxially rotating, so that the user only needs to rotate one of the first connecting member 2122 and the second connecting member 2123 to enable the first connecting member 2122 to connect the photographing device 10 to the first connecting member 2122 and the second connecting member 2123 to be adjustable to synchronize the rotation of the photographing device 10 connected to the first connecting member 2122 and the external device connected to the second connecting member 2123. Of course, in some embodiments, the first connecting member 2122 and the second connecting member 2123 may not be coaxially rotated, i.e., the user is able to individually control the rotation of the photographing device 10 connected to the first connecting member 2122 and/or individually control the rotation of the external device connected to the second connecting member 2123, which will not be discussed herein.

It is noted that in some embodiments, the external device to which the second connecting member 2123 is connected may also be a photographing device 10. Specifically, the photographing system 100 comprises two photographing devices 10, the first connecting member 2122 being magnetically connected to one of the photographing devices 10, and the second connecting member 2123 being magnetically connected to the other photographing device 10, with the positions of both of the photographing devices 10 with respect to the support member 2121 being adjustable. Of course, the external device to which the second connecting member 2123 is connected may also be other expansion components 20, which will not be discussed herein.

Figure 17:
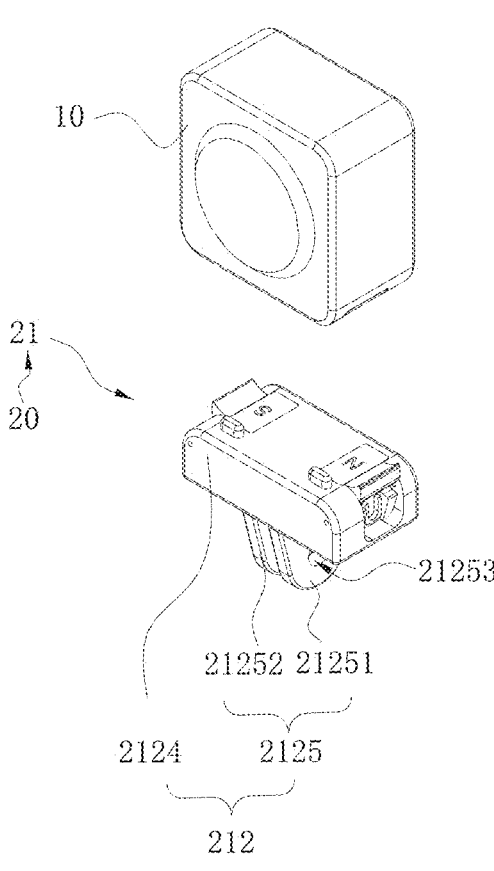

Referring to FIG. 17, in some embodiments, the base 212 may further include a loading member 2124 and a connection assembly 2125. The loading member 2124 is magnetically coupled to the first body 11 of the photographing device 10, and the loading member 2124 is coupled to the connection assembly 2125 on a side away from the first body 11. The connection assembly 2125 is used for removably connecting with an external device to expand the use scenarios of the photographing device 10. Exemplarily, the connection assembly 2125 includes a first protruding portion 21251 and a second protruding portion 21252 spaced apart, and the first protruding portion 21251 and the second protruding portion 21252 are provided with mounting holes 21253 on the side away from the loading member 2124. When the connection assembly 2125 is connected to the external device, the first protruding portion 21251 and the second protruding portion 21252 are able to extend into the mounting groove of the external device and combine therewith, and the screw passes through the mounting holes 21253 to fix the connection assembly 2125 to the external device, thereby realizing the connection assembly 2125 is connected to the external device.

Figure 18:
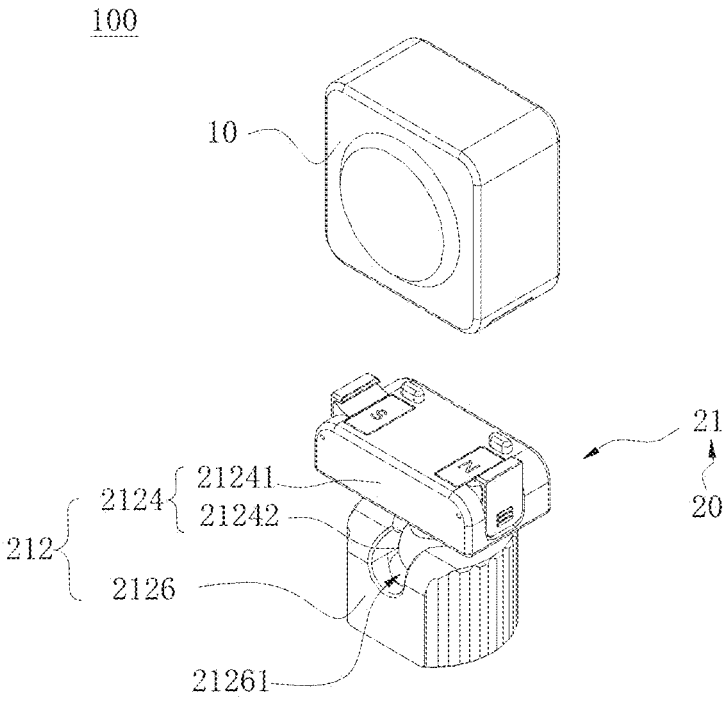

Referring to FIG. 18, in some embodiments, the base 212 may also include a loading member 2124 and a fixing member 2126. The loading member 2124 includes a carrier portion 21241 and a ball joint 21242, the ball joint 21242 is connected to the carrier portion 21241, and the side of the carrier portion 21241 that is away from the ball joint 21242 can be magnetically connected to the first body 11 of the photographing device 10. The fixing member 2126 is provided with a recess 21261 in which the ball joint 21242 is partially housed, and the ball joint 21242 is capable of rotating within the recess 21261. The ball joint 21242 is capable of rotating the photographing device 10 relative to the fixing member 2126. In this way, by rotating the ball joint 21242, the relative position of the photographing device 10 can be adjusted so that the photographing device 10 can shoot images in either direction, expanding the scenarios in which the photographing system 100 can be used. In some embodiments, the fixing member 2126 is also capable of being detachably connected with other external devices, exemplarily, the side of the fixing member 2126 that is away from the ball joint 21242 is provided with threaded holes, so that when the fixing member 2126 is connected with the external device, the screw on the external device can be locked in the threaded holes, thereby connecting the base 212 with the external device. Of course, the fixing member 2126 can be connected to the external device in other ways, and will not be limited herein.

Figure 19:
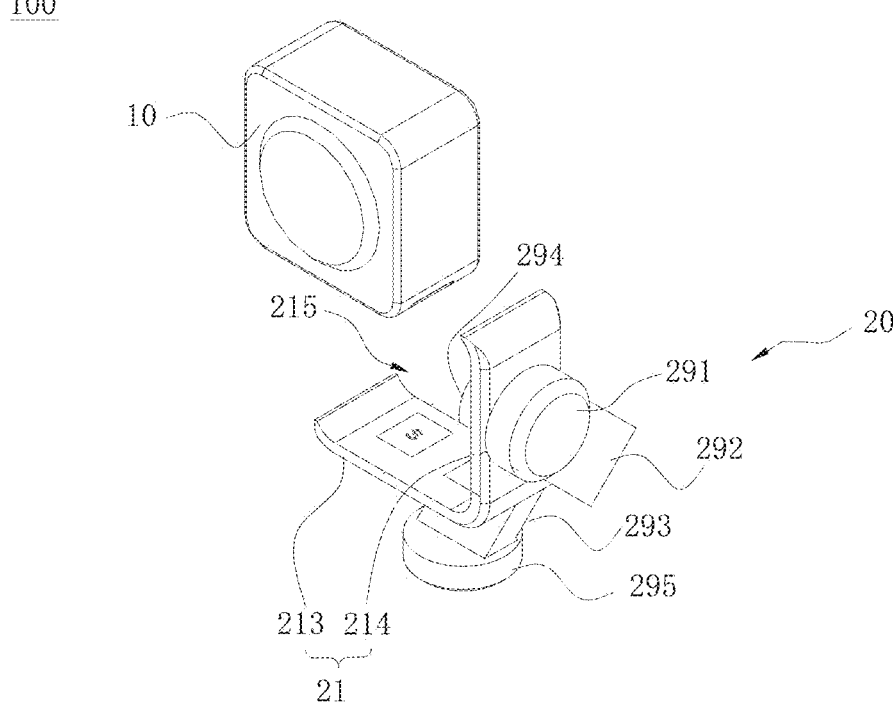

Referring to FIG. 19, in some embodiments, the second body 21 is magnetically connected to the photographing device 10, and the expansion component 20 includes a first motor 291 connected to the second body 21, and the first motor 291 is capable of driving the second body 21 to move, thereby driving the photographing device 10 to move. In this way, the relative position of the photographing device 10 can be adjusted so that the photographing device 10 can shoot images in any one direction, expanding the use scenarios of the photographing system 100.

In some embodiments, as shown in FIG. 19, the second body 21 may include a first bracket 213 and a second bracket 214. The second bracket 214 is coupled to the first bracket 213 and forms a holding space 215 for housing the photographing device 10. When the photographing device 10 is housed in the holding space 215, one of the two adjacent sides of the photographing device 10 is borne on the second bracket 214, and the other side of the photographing device 10 resides on the first bracket 213. In some embodiments, the first bracket 213 is magnetically coupled to the photographing device 10, when the second magnetic member 24 of the expansion component 20 is provided on the first bracket 213, and the first magnetic member 14 of the photographing device 10 is provided on the side of the photographing device 10 near the first bracket 213. In some embodiments, the second bracket 214 may also be magnetically connected to the photographing device 10, where the second magnetic member 24 of the expansion component 20 is provided on the second bracket 214, and the first magnetic member 14 of the photographing device 10 is provided on the side of the photographing device 10 near the second bracket 214. Of course, in some embodiments, both the first bracket 213 and the second bracket 214 are magnetically connected to the photographing device 10, which is not limited herein. Both the first bracket 213 and the second bracket 214 being magnetically connected to the photographing device 10 as compared to, only the first bracket 213 or only the second bracket 214 being magnetically connected to the photographing device 10, can enable the photographing device 10 to be more closely connected to the expansion component 20, and to avoid the photographing device 10 being dislodged from the holding space 215.

In some embodiment, the first motor 291 is provided on a side of the second bracket 214 away from the holding space 215, and the second motor 294 is capable of driving the second bracket 214 to move, thereby driving the photographing device 10 housed in the holding space 215 to move. It is noted that, in some embodiments, the first motor 291 may include any one of a yaw axis motor, a roll axis motor, or a pitch axis motor.

Referring to FIG. 19, in some embodiments, the expansion component 20 may also include a first shaft arm 292, a second shaft arm 293, a second motor 294, and a third motor 295. Specifically, the first shaft arm 292 includes a first end 2921 and a second end 2922 that are opposite each other, the first end 2921 of the first shaft arm 292 is connected to the first motor 291, and the second end 2922 of the first shaft arm 292 is connected to the second motor 294. The second motor 294 is capable of driving the first shaft arm 292 to move to drive the photographing device 10. The second shaft arm 293 includes a first end 2931 and a second end 2932 that are back-to-back, the first end 2931 of the second shaft arm 293 is connected to the second motor 294, the second end 2932 of the second shaft arm 293 is connected to the third motor 295, and the third motor 295 is capable of driving the second shaft arm 293 in motion to drive the photographing device 10 in motion.

Figure 20:
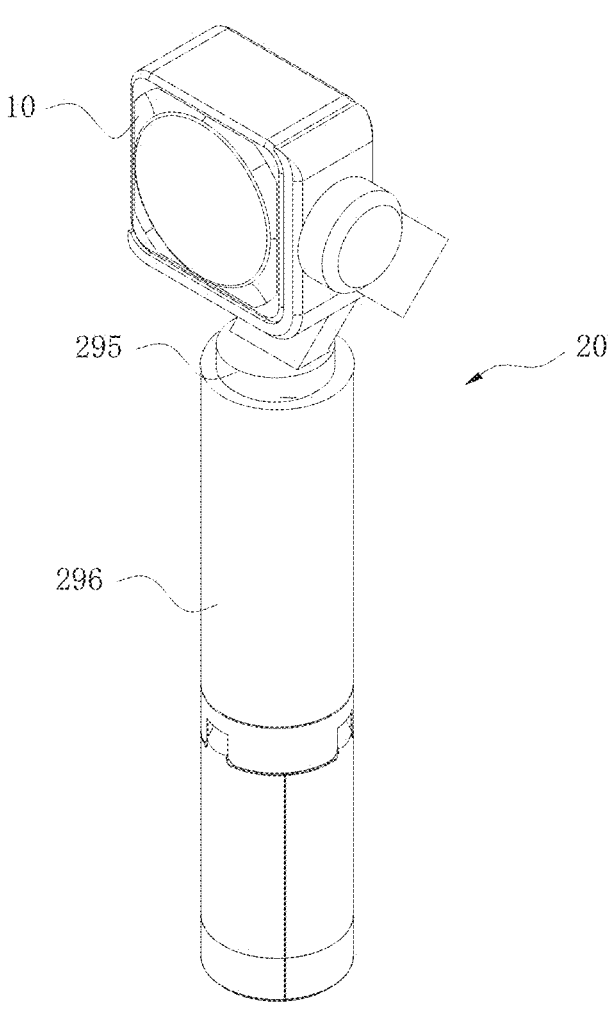
FIGS. 20 to 22 are schematic diagrams of structures of a photographing system in some embodiments of the present disclosure.
Figure 21:
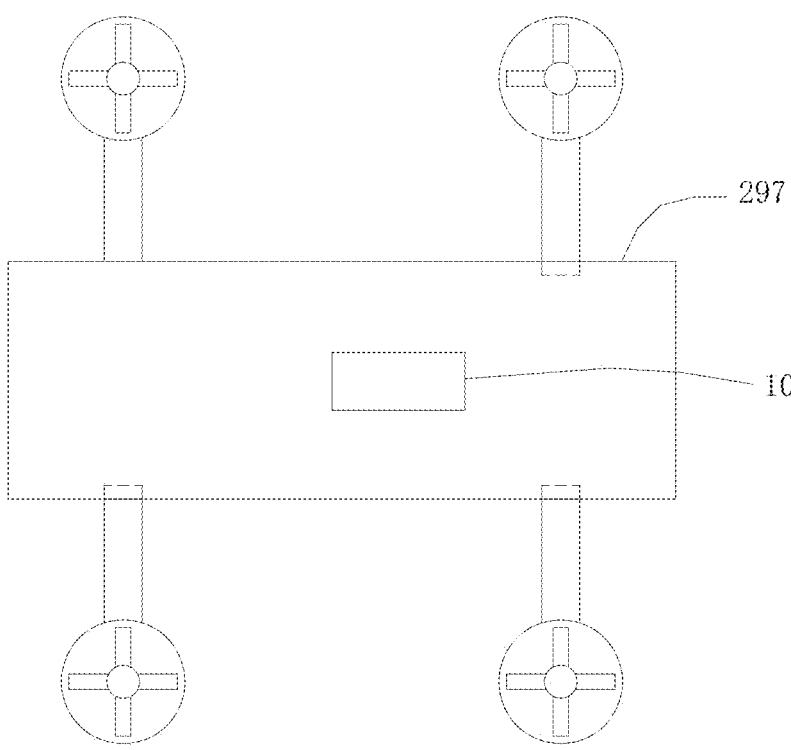

It should be noted, referring to FIG. 20, that in some embodiments, the expansion component 20 may also include a handle 296, the handle 296 being connected to the side of the third motor 295 that is away from the second shaft arm 293. At this point, the expansion component 20 may be a handheld head, and since the expansion component 20 includes the handle 296, a user may hold the handle 296 when the photographing device 10 is connected to the expansion component 20. In addition, in some embodiments, as shown in FIG. 21, the expansion component 20 may further include a movable platform 297, the movable platform 297 being connected to the side of the third motor 295 that is away from the second shaft arm 293. Of course, in some embodiments, the photographing device 10 may also be detachably connected to the removable platform 297 by the bracket, or the removable platform 297 may also be provided with a second quick-release interface 201 capable of cooperating with a first quick-release interface 101 of the photographing device 10, and the first quick-release interface 101 may be detachably connected to the second quick-release interface 201 on the removable platform 297 to realize the detachable connection between the photographing device 10 and the removable platform 297. The movable platform 297 may be a drone, a car, or the like that includes a power system to provide movement power for itself, without limitation herein.

Figure 12:
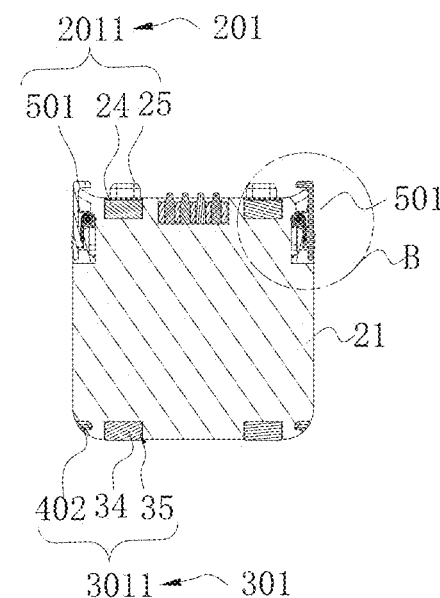
FIG. 12 is a schematic cross-sectional view of an expansion component in some embodiments of the present disclosure.
Figure 13:
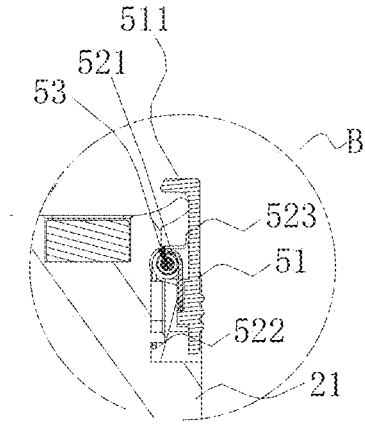
FIG. 13 is an enlarged schematic view of area B of the expansion component of FIG. 12.
Figure 22:
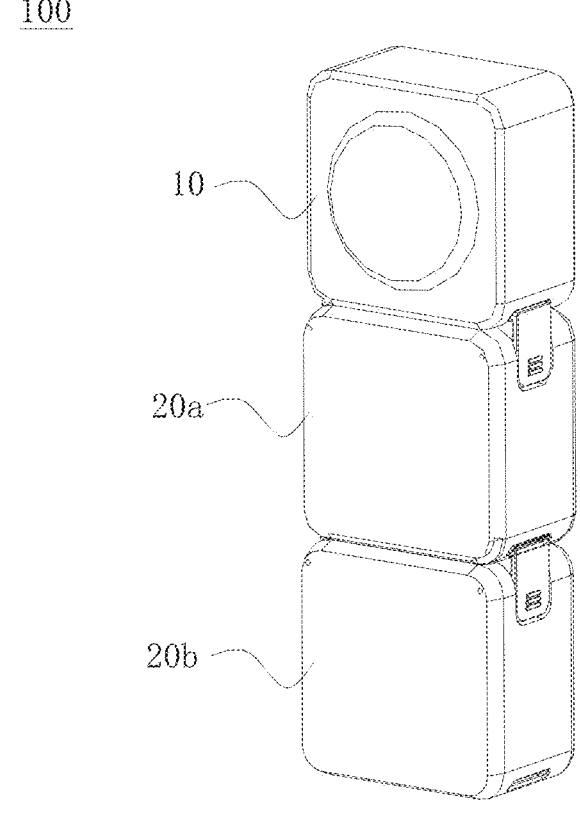

Referring to FIG. 10, FIG. 12, and FIG. 22, in some embodiments, the photographing system 100 may include a plurality of expansion components 20, the expansion components 20 further including a third quick-release interface 301, and any one of the expansion components 20 being able to be detachably connected to at least one of the other expansion components 20, so as to be able to further expand the functionality of the photographing device 10 and/or the scenarios of use.

Specifically, referring to FIG. 12, in some embodiments, the expansion component 20 is provided with a second quick-release interface 201 and a third quick-release interface 301 on different sides of the expansion component 20, and the third quick-release interface 301 of one expansion component 20 is capable of being removably connected to the second quick-release interface 201 of the other expansion component 20 to realize the removable connection of the two expansion members 20.

In particular, in some embodiments, either expansion component 20 is capable of being magnetically coupled to at least one of the other expansion components 20. Specifically second quick release interface 201 comprises a second mechanical coupling interface 2011, and third quick release interface 301 comprises a third mechanical coupling interface 3011. At least one of the first mechanical coupling interface 1011 and the second mechanical coupling interface 2011 comprises a magnetic member to enable the photographing device 10 to be adsorbed with the expansion component 20. More specifically, referring to FIG. 12, the second mechanical coupling interface 2011 includes a second magnetic member 24, and the third coupling interface 3011 includes a third magnetic member 34, wherein the third magnetic member 34 of one expansion component 20 is capable of being magnetically coupled to the second magnetic member 24 of the other expansion component 20 when the two expansion components 20 are connected. For example, with reference to FIG. 22, the photographing system 100 includes a photographing device 10, a first expansion component 20a, and a second expansion component 20b. The photographing device 10 is provided with a first magnetic member 14, the first expansion component 20a is provided with a second magnetic member 24 and a third magnetic member 34 on opposite sides, and the second expansion component 20b is provided with a second magnetic member 24. The second magnetic member 24 is capable of being magnetically connected to the first magnetic member 14 of the photographing device 10, and the third magnetic member 34 of the first expansion component 20a is capable of being magnetically connected to the second magnetic member 24 of the third expansion component 202. It is noted that in some embodiments, the photographing system 100 may also include a third expansion component 203, the third expansion component 203 being provided with a second magnetic member 24. The second expansion member 20b may also include a third magnetic member 34, and the third magnetic member 34 of the second expansion member 20b is capable of being magnetically connected to the second magnetic member 24 of the third expansion component 203.

Referring to FIG. 12, in some embodiments, the second mechanical coupling interface 2011 further comprises a second positioning member 25, and the third mechanical coupling interface 3011 further comprises a third positioning member 35, so that when the two expansion components are connected, the third positioning member 35 of one expansion component 20 is able to combine with the second positioning member 25 of the other expansion component 20. The combination of the third positioning member 35 and the second positioning member 25 can provide a positioning function when the two expansion components 20 are connected, which facilitates the connection of the two. For example, with reference to FIG. 22, the photographing system 100 includes a photographing device 10, a first expansion component 20a, and a second expansion component 20b. The photographing device 10 is provided with a first positioning member 15, the first expansion component 20a is provided with a second positioning member 25 and a third positioning member 35 on both sides of the first expansion component 20a, and the second expansion component 20b is provided with the second positioning member 25. The second positioning member 25 of the first expansion component 20a is capable of being coupled with the first positioning member 15 of the photographing device 10, and the third positioning member 35 of the first expansion component 20a is capable of being coupled with the second positioning member 25 of the third expansion component 202. It is to be noted that, in some embodiments, the photographing system 100 may also include a third expansion component 203, which is provided with the second positioning member 25. The second expansion component 20b may also include a third positioning member 35, which is provided with the second positioning member 25, and the second expansion component 20b is provided with the second positioning member 25. The third positioning member of the second expansion member 20b is capable of combining with the second positioning member 25 of the third expansion member 203. Furthermore, in some embodiments, one of the third positioning member 35 and the second positioning member 25 comprises a positioning post and the other comprises a positioning hole, and the positioning post is at least partially housed in the positioning hole when the two expansion members 20 are connected.

Figure 11:
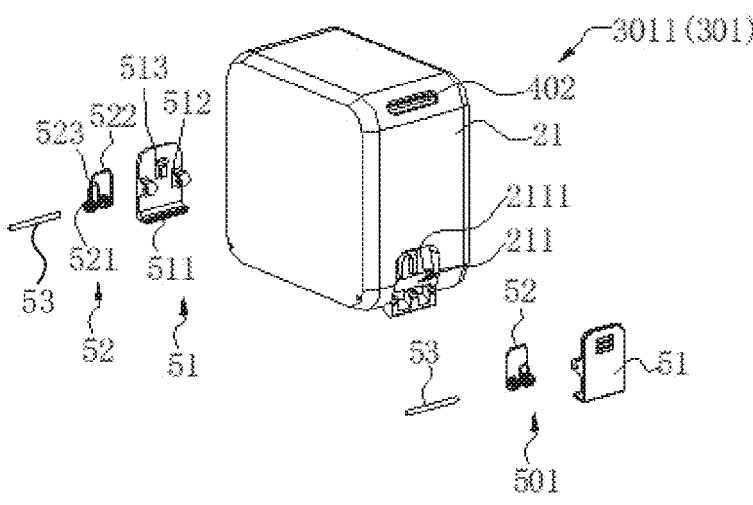
FIG. 11 is an exploded schematic view of a structure of an expansion component in some embodiments of the present disclosure.

Referring to FIGS. 10 and 11, in some embodiments, the second mechanical coupling interface 2011 further comprises a second coupling member 501 and the third mechanical coupling interface 3011 further comprises a fourth coupling member 402 (as shown in FIG. 10). Of course, in some embodiments, the second mechanical coupling interface 2011 may also include a fourth coupling member 402, and the third mechanical coupling interface 3011 may also include a second coupling member 501. When the two expansion components 20 are connected, the fourth coupling member 402 on one of the expansion components 20 combines with the second coupling member 501 of the other expansion component 50 to lock the two expansion components 20. This can prevent the user from using the photographing system 100 in such a way as to increase the stability between the two connected expansion components 20. It should be noted that, for example, the photographing system 100 comprises a photographing device 10, a first expansion component 20a and a second expansion component 20b. The photographing device 10 is detachably connected to the first expansion component 20a, and the second expansion component 20b is also detachably connected to the first expansion component 20a. When the first coupling member 401 is provided on the photographing device 10, the second coupling member 501 on the first expansion component 20a combines with the first coupling member 401 on the photographing device 10 to lock the photographing device 10 and the first expansion component 20a. The fourth coupling member 402 on the first expansion component 20a combines with the second coupling member 501 on the second expansion component 20b to lock the first expansion component 20a and the second expansion component 20b. When a third coupling member 502 is provided on the photographing device 10, the fourth coupling member 402 on the first expansion component 20a combines with the third coupling member 502 on the photographing device 10 to lock the photographing device 10 and the first expansion component 20a. The second coupling member 501 on the first expansion component 20a combines with the fourth coupling member 402 on the second expansion component 20b to lock the first expansion component 20a and the second expansion component 20b.

Of course, in some embodiments, an electrical connection may also be realized between the two expansion components 20 that are connected. Specifically, the third quick-release interface 301 also includes a third electromechanical coupling interface, in which the second electromechanical coupling interface 2011 of one of the two expansion components 20 is coupled with the third electromechanical coupling interface 3011 of the other expansion component 20 when the second electromechanical coupling interface 2012 of one expansion component 20 is coupled with the third electromechanical coupling interface of the other expansion component 20' to realize an electrical connection between the two expansion components 20.

Referring to FIG. 23, an embodiment of the present disclosure also provides a control system 200 of the movable platform 80. The control system 200 includes the photographing device 10 described in any of the above embodiments, the movable platform 80, and the carrier apparatus 70, the carrier apparatus 70 being used to carry the photographing device 10. wherein the photographing device 10 is optionally removably coupled to the carrier apparatus 70 or removably coupled to the movable platform 80. It is noted that, in some embodiments, the photographing device 10 is capable of being detachably coupled directly to the removable platform 80 via the first quick release interface 101. In some embodiments, the specific implementation in which the photographing device 10 is detachably connected to the removable platform 80 may also be the same as the connection between the photographing device 10 and the removable platform 292 in the embodiment as described in FIG. 21, and is not limited herein.

In some embodiments, referring to FIG. 24, the carrier apparatus 70 includes a second quick-release interface 701, at least one attitude sensor 71, a wireless communication device 72, and a controller 73. The second quick-release interface 701 is used for detachably connecting with the photographing device 10, and specifically, the second quick-release interface 701 is capable of detachably connecting with the first quick-release catch 101 of the photographing device 10 to realize the detachable connection between the photographing device 10 and the carrier apparatus 70. It is noted that, in some embodiments, the second quick-release interface 701 of the carrier apparatus 70 may be the same as the second quick-release interface 201 of the expansion component 20 described in any of the above embodiments. In addition, the second quick-release interface 701 of the carrier apparatus 70 may specifically cooperate with the first quick-release interface 101 of the photographing device 10 in the same way as the second quick-release interface 201 of the expansion component 20 specifically cooperates with the first quick-release interface 101 of the photographing device 10 in any of the embodiments described above, none of which will be repeated herein.

The at least one attitude sensor 71 may be used to collect the first attitude information of the carrier apparatus 70. Wherein the number of attitude sensors 71 on the carrier apparatus 70 may be one or more, none of which are limited herein. The wireless communication device 72 may be used to wirelessly communicate with the movable platform 80 to realize wireless communication between the carrier apparatus 70 and the movable platform 80.

The controller 73 may be able to control the photographing device 10 to film when the photographing device 10 is detachably connected to the carrier apparatus 70. In one embodiment, the controller 73 is electrically connected to the second quick-release interface 701, and when the photographing device 10 is detachably connected to the carrier apparatus 70, the controller 73 can control the photographing device 10 to film via the second quick-release interface 701. When the photographing device 10 is detachably connected to the removable platform 80, the controller 73 remotely controls the movement of the removable platform 80 or/and the photographing of the photographing device 10 based on the first attitude information via the wireless communication device 72. Specifically, the controller 73 can be electrically connected to at least one attitude sensor 71 and the wireless communication device 72, so that the controller 73 can obtain the first attitude information detected by the attitude sensor 71 and the controller 73 can remotely control the movement of the movable platform 80 or/and the photographing of the photographing device 10 via the wireless communication device 72. In this way, the carrier apparatus 70 is capable of controlling the photographing device 10 to shoot, and when the photographing device 10 is connected to the movable platform 80, the carrier apparatus 70 can also control the movement of the movable platform 80 based on its own attitude information, thereby increasing the disclosure scenarios of the control system 200.

Referring to FIG. 25, in some embodiments, the carrier apparatus 70 includes a body 74 and a carrier assembly 75. The carrier assembly 75 is connected to the body 74, and the carrier apparatus 70 is detachably connected to the photographing device 10 via the carrier assembly 75. Wherein, a second quick release interface 701 is provided on the carrier assembly 75 so that the carrier assembly 75 is detachably connected to the photographing device 10. Exemplarily, in some embodiments, the carrier assembly 75 further comprises at least one swivel axis 76, the swivel axis 76 being used to change the attitude of the carrier assembly 75 to adjust the attitude of the photographing device 10 in case the photographing device 10 is connected to the carrier apparatus 70. This enables the photographing device 10 to be able to capture images in any one direction, expanding the use scenarios of the photographing device 10.

Referring to FIG. 25, in some embodiments, the carrier apparatus 70 may also include a telescoping assembly 77. The telescoping assembly 77 is used to connect the body 74 and the carrier assembly 75 to enable the carrier apparatus 70 to adjust the distance between the carrier assembly 75 and the body 74. In this way, in the case where the photographing device 10 is connected to the carrier apparatus 70, the user is able to adjust the distance between the photographing device 10 and the body 74 according to the photographing needs. In particular, in some embodiments, the carrier apparatus 70 may also include an antenna of the wireless device 72, the antenna being provided at the free end of the telescopic assembly 77. The antenna is used for the carrier apparatus 70 to be communicatively connected to the movable platform 80 when the photographing device 10 is connected to the movable platform 80. Since the carrier apparatus 70 is provided with the antenna of the wireless device 72, this facilitates wireless communication between the carrier apparatus 70 and the movable platform 80. Among them, in some embodiments, the free end of the telescopic assembly 77 is an end away from the body 74, i.e., the antenna is provided at the end of the telescopic assembly 77 away from the body 74, and is not limited herein.

Figure 26:
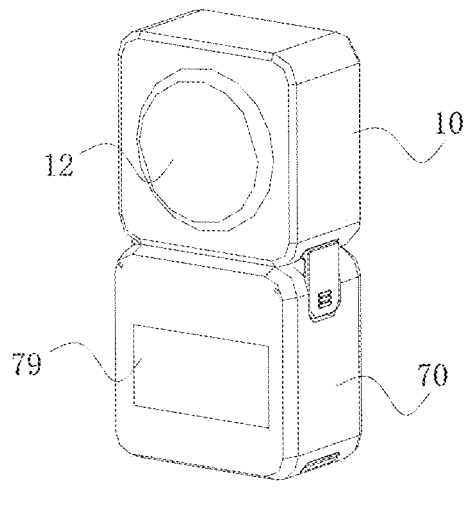
FIG. 26 is a schematic diagram of a carrier apparatus coupled to a photographing device in some embodiments of the present disclosure.

Referring to FIG. 26, in some embodiments, the carrier apparatus 70 may further comprise a display module 79. When the carrier apparatus 70 is connected to the photographing device 10, the display module 79 is used to display a first image captured by the photographing device 10, and/or to display a GUI interface of the photographing device 10. It is noted that, as shown in FIG. 26, in one example, when the carrier apparatus 70 is connected to the photographing device 10, the display module 79 may be oriented in the same direction as the incoming light direction of the image sensor 12 of the photographing device 10; in another example, when the carrier apparatus 70 is connected to the photographing device 10, the display module 79 may also be oriented opposite to the incoming light direction, which is not limited herein. In this regard, the orientation of the display module 79 is the side on which the display module 79 is capable of displaying a picture.

In the description of the present specification, reference is made to the terms "certain embodiments", "an embodiment", "some embodiments", "example", "specific embodiments", "particular embodiments", and "specific embodiments", "specific examples", or "some examples", etc. are described to mean that specific features, structures, materials, or characteristics described in conjunction with the embodiment or example are included in at least one embodiment or example of the present disclosure. In this specification, schematic expressions of the above terms need not be directed to the same embodiment or example. Moreover, the specific features, structures, materials, or characteristics described may be combined in any one or more embodiments or examples in a suitable manner. Furthermore, without contradicting each other, those skilled in the art may combine and combine different embodiments or examples and features of different embodiments or examples described in this specification.

Furthermore, the terms "first" and "second" are used for descriptive purposes only and are not to be understood as indicating or implying relative importance or implicitly specifying the number of technical features indicated. Thus, a feature defined with the terms "first", "second" may expressly or implicitly include at least one of the described features. In the description of the present disclosure, "plurality" means at least two, e.g., two, three, unless otherwise expressly and specifically limited.

Although embodiments of the present disclosure have been shown and described above, it is to be understood that the above embodiments are exemplary and are not to be construed as a limitation of the present disclosure, and that a person of ordinary skill in the art may make changes, modifications, substitutions, and variations of the above embodiments within the scope of the present disclosure, which is limited by the claims and their equivalents.

What is claimed is:

1. A photographing device, comprising:
an image sensor configured to capture a first image;
a first quick release interface configured to detachably connect with an expansion structure; and
a first processor configured to control the photographing device to perform an operation based on a first instruction input by a user at the photographing device and a second instruction sent by the expansion structure under a condition that the photographing device is connected with the expansion structure, the operation comprising controlling the image sensor to capture the first image;
wherein:
the expansion structure includes a display screen, the display screen and the image sensor face a same direction when the expansion structure is connected to the image sensor through the first quick release interface, and the display screen is configured to display the first image captured by the image sensor;
the photographing device further comprises a detector to determine whether the expansion structure is detachably connected to the photographing device, the first processor being electrically connected to the detector; and
under a condition that the first processor determines that the expansion structure is detachably connected to the photographing device, the first processor is further configured to control the photographing device to switch from a first mode to a second mode.

2. The photographing device according to claim 1, wherein:
the first quick release interface includes a first electrical coupling interface and a first mechanical coupling interface;
the expansion structure includes a second quick release interface to couple with the first quick release interface, the second quick release interface including a second electrical coupling interface and a second mechanical coupling interface; and
under a condition that the first mechanical coupling interface is coupled with the second mechanical coupling interface, the first electrical coupling interface is coupled with the second electrical coupling interface, and the second instruction is capable of being transmitted to the first processor of the photographing device through the second electrical coupling interface and the first electrical coupling interface.

3. The photographing device according to claim 2, wherein:
the first electrical coupling interface of the first quick release interface further comprises a first connector on a side of the photographing device;

under a condition that the photographing device is connected with the expansion structure, the first connector cooperates with the expansion structure to realize a communication connection with the expansion structure.

4. The photographing device according to claim 3, wherein the first connector comprises a first contact, and the first contact cooperates with the expansion structure under the condition that the photographing device is connected with the expansion structure to realize the communication connection between the photographing device and the expansion structure.

5. The photographing device according to claim 3, comprising:
   a first battery;
   wherein the first connector cooperates with the expansion structure to enable the first battery to power the expansion structure through the first connector under the condition that the photographing device is connected with the expansion structure.

6. The photographing apparatus according to claim 1, wherein the detector is a Hall sensor, at least one of the first mechanical coupling interface or the second mechanical coupling interface comprises a magnetic structure,
   wherein the Hall sensor is configured to determine that the expanding structure is detachably coupled with the photographing device under a condition that the first mechanical coupling interface is coupled with the second mechanical coupling interface.

7. The photographing device according to claim 1, wherein the detector is a pressure switch which is triggered when the first mechanical coupling interface is coupled with the second mechanical coupling interface.

8. The photographing device according to claim 1, wherein the photographing device has a higher power consumption rate in the second mode than in the first mode.

9. The photographing apparatus according to claim 1, wherein
   the first processor is further configured to:
      determine a first time when the first instruction is acquired and a second time when the second instruction is acquired, and determine execution of the first instruction and/or the second instruction during the operation based on a difference or sequence of the first time and the second time.

10. The photographing device according to claim 1, further comprising:
   a battery;
   wherein:
      the first quick release interface comprises a contact on a side of the photographing device; and
      the contact cooperates with the expansion structure to enable the battery to power the expansion component via the contact under the condition that the photographing device is connected with the expansion structure.

11. The photographing device according to claim 1, wherein:
   the display screen and the image sensor face the same direction when the expansion structure is connected to the image sensor through the first quick release interface in a first form; and
   the display screen and the image sensor face different directions when the expansion structure is connected to the image sensor through the first quick release interface in a second form.

12. A photographing system, comprising:
   a photographing device, the photographing device comprising:
      an image sensor configured to capture a first image; and
      a first quick release interface; and
      a first processor; and
   an expansion structure, the expansion structure comprising a display screen and a second quick release interface, the second quick release interface cooperating with the first quick release interface, the display screen and the image sensor facing a same direction when the expansion structure is connected to the image sensor through the first quick release interface and the second quick release interface, and the display screen being configured to display the first image captured by the image sensor, and the second quick release interface capable of being detachably connected with the first quick release interface;
   wherein:
      the first processor is configured to control the photographing device to perform an operation based on a first instruction input by a user at the photographing device and a second instruction sent by the expansion structure under a condition that the photographing device is connected with the expansion structure, the operation comprising controlling the image sensor to capture the first image;
      the photographing device further comprises a detector to determine whether the expansion structure is detachably connected to the photographing device, the first processor being electrically connected to the detector; and
      under a condition that the first processor determines that the expansion structure is detachably connected to the photographing device, the first processor is further configured to control the photographing device to switch from a first mode to a second mode.

13. The photographing system according to claim 12, wherein:
   the first quick release interface comprises a first electrical coupling interface and a first mechanical coupling interface, and the second quick release interface comprises a second electrical coupling interface and a second mechanical coupling interface;
   under a condition that the first mechanical coupling interface is coupled with the second mechanical coupling interface, the first electrical coupling interface is coupled with the first second electrical coupling interface; and
   the second instruction is capable of being transmitted to the first processor of the photographing device through the second electrical coupling interface and the first electrical coupling interface.

14. A photographing device, comprising:
   a first body;
   a first quick release interface in the first body configured to detachably connect with a second quick release interface of an expansion structure; the first quick release interface comprising a first mechanical coupling interface, and the second quick release interface comprising a second mechanical coupling interface; and
   an image sensor in the first body configured to capture a first image;

wherein:

at least one of the first mechanical coupling interface or the second mechanical coupling interface comprises a magnetic structure to adsorb the photographing device to the expansion structure;

the first mechanical coupling interface comprises a first coupling structure disposed on the first body, and the second mechanical coupling interface comprises a second coupling structure disposed on the expansion structure, the first coupling structure is coupled with the second coupling structure to lock the photographing device with the expansion structure;

the first coupling structure comprises a snap fastener, a connecting rod, and an elastic structure, the snap fastener includes a snap hook on a side of the snap fastener away from the first body, the snap fastener includes a mounting hole, the elastic structure includes a sleeve portion, a first connection portion, and a second connection portion, the connecting rod passes through the sleeve portion and the mounting hole and is received in a mounting groove at a side wall of the first body, the connecting rod is connected to the first connection portion, the first connection portion is connected to the first body, and the second connection portion is connected to the snap hook; and under a condition that the first coupling structure is coupled with the second coupling structure, the snap hook is at least partially accommodated in the groove of the second coupling structure.

15. The photographing device according to claim 14, wherein the first quick release interface further comprises a first electrical coupling interface, and the second quick release interface further comprises a second electrical coupling interface, under a condition that the first mechanical coupling interface is coupled with the second mechanical coupling interface, the first electrical coupling interface is coupled with the second electrical coupling interface.

16. The photographing device according to claim 14, wherein the first mechanical coupling interface further comprises a first magnetic structure provided on at least one side of the first body, and the second mechanical coupling interface further comprises a second magnetic structure, the first magnetic structure being magnetically adsorbed with the second magnetic structure.

17. The photographing apparatus according to claim 14, wherein:

under a condition that the snap hook is subjected to a force, the elastic structure undergoes an elastic deformation to move the snap hook away from the first body, and a side of the snap fastener away from the snap hook moves closer to the first body; and under a condition that the force exerted on the snap fastener disappears, an elastic restoring force of the elastic structure moves the snap hook closer to the first body, and the side of the snap fastener away from the snap hook moves farther away from the first body.

* * * * *